(12) United States Patent
Lee et al.

(10) Patent No.: US 12,447,464 B2
(45) Date of Patent: Oct. 21, 2025

(54) POLYCATIONIC MICROFIBERS AND METHODS OF USING THE SAME

(71) Applicant: Duke University, Durham, NC (US)

(72) Inventors: Jaewoo Lee, Durham, NC (US); Bruce A. Sullenger, Durham, NC (US); Jennifer G. Jackman, Durham, NC (US)

(73) Assignee: Duke University, Durham, NC (US)

( * ) Notice: Subject to any disclaimer, the term of this patent is extended or adjusted under 35 U.S.C. 154(b) by 1156 days.

(21) Appl. No.: 16/472,735

(22) PCT Filed: Dec. 22, 2017

(86) PCT No.: PCT/US2017/068262
§ 371 (c)(1),
(2) Date: Jun. 21, 2019

(87) PCT Pub. No.: WO2018/119422
PCT Pub. Date: Jun. 28, 2018

(65) Prior Publication Data
US 2021/0129110 A1 May 6, 2021

Related U.S. Application Data

(60) Provisional application No. 62/451,863, filed on Jan. 30, 2017, provisional application No. 62/437,802, filed on Dec. 22, 2016.

(51) Int. Cl.
*B01J 20/26* (2006.01)
*A01N 1/02* (2006.01)
(Continued)

(52) U.S. Cl.
CPC ............ *B01J 20/264* (2013.01); *A01N 1/143* (2025.01); *B01D 39/083* (2013.01);
(Continued)

(58) Field of Classification Search
CPC ..... A01N 1/0247; A61M 1/34; A61M 1/3679; B01D 2239/0233; B01D 2239/0421;
(Continued)

(56) References Cited

U.S. PATENT DOCUMENTS

| 4,581,010 A | 4/1986 | Skurkovich |
| 5,276,088 A | 1/1994 | Yoshinaga |

(Continued)

FOREIGN PATENT DOCUMENTS

| CA | 2495213 C | * 5/2011 | .......... C08F 293/005 |
| WO | 2002/019822 | 3/2002 | |

(Continued)

OTHER PUBLICATIONS

Abe R, et al. Continuous hemodiafiltration using a polymethyl methacrylate membrane hemofilter for severe acute pancreatitis. Contrib Nephrol. 2010;166:54-63.
(Continued)

*Primary Examiner* — Dirk R Bass
(74) *Attorney, Agent, or Firm* — Quarles & Brady, LLP

(57) ABSTRACT

Disclosed herein are polycationic microfibers comprising a high-aspect-ratio polymeric core, the polymeric core comprising a blend of a first core polymer and a second core polymer, and a polycationic polymer immobilized on the surface of the polymeric core. The polycationic microfibers are capable of sequestering or clearing nucleic acids, proteins, biomolecular complexes, exosomes, or microparticles from solutions and samples and may be formed into filters or integrated into filtration apparatuses. Also disclosed are methods for sequestering or clearing solutes from solutions and fluids, methods for the treatment of diseases or conditions, and methods for the prevention of diseases or conditions.

17 Claims, 11 Drawing Sheets

(51) Int. Cl.

| | | |
|---|---|---|
| A01N 1/143 | (2025.01) | |
| A61M 1/34 | (2006.01) | |
| B01D 39/08 | (2006.01) | |
| B01D 67/00 | (2006.01) | |
| B01D 69/02 | (2006.01) | |
| B01D 69/14 | (2006.01) | |
| B01D 71/28 | (2006.01) | |
| B01D 71/40 | (2006.01) | |
| B01D 71/82 | (2006.01) | |
| B01J 20/28 | (2006.01) | |
| B01J 20/30 | (2006.01) | |
| B01J 20/32 | (2006.01) | |
| D01F 6/42 | (2006.01) | |
| D01F 6/56 | (2006.01) | |
| D06M 15/61 | (2006.01) | |

(52) U.S. Cl.
CPC ....... *B01D 67/00042* (2022.08); *B01D 69/02* (2013.01); *B01D 69/1411* (2022.08); *B01D 71/281* (2022.08); *B01D 71/401* (2022.08); *B01D 71/82* (2013.01); *B01J 20/261* (2013.01); *B01J 20/28023* (2013.01); *B01J 20/3007* (2013.01); *B01J 20/321* (2013.01); *B01J 20/3272* (2013.01); *B01J 20/3293* (2013.01); *D01F 6/42* (2013.01); *D01F 6/56* (2013.01); *D06M 15/61* (2013.01); *A61M 1/34* (2013.01); *B01D 2239/0421* (2013.01); *B01D 2239/0428* (2013.01); *B01D 2325/16* (2013.01); *D06M 2400/01* (2013.01)

(58) Field of Classification Search
CPC ........ B01D 2239/0428; B01D 2323/39; B01D 2325/16; B01D 39/083; B01D 67/0004; B01D 69/02; B01D 69/141; B01D 71/28; B01D 71/40; B01D 71/82; B01J 20/261; B01J 20/264; B01J 20/267; B01J 20/28023; B01J 20/3007; B01J 20/321; B01J 20/3272; B01J 20/3293; D01D 5/0007; D01F 6/42; D01F 6/56; D06M 15/61; D06M 2400/01
See application file for complete search history.

(56) References Cited

U.S. PATENT DOCUMENTS

| | | | |
|---|---|---|---|
| 5,608,015 | A | 3/1997 | Yoshinaga |
| 5,855,900 | A | 1/1999 | Nobuhiko |
| 6,127,448 | A * | 10/2000 | Domb ............... A61L 27/50 523/105 |
| 6,509,323 | B1 | 1/2003 | Davis et al. |
| 6,884,789 | B2 | 4/2005 | Davis et al. |
| 7,018,609 | B2 | 3/2006 | Hwang Pun et al. |
| 7,091,192 | B1 | 8/2006 | Davis et al. |
| 7,166,302 | B2 | 1/2007 | Pun et al. |
| 7,270,808 | B2 | 9/2007 | Cheng et al. |
| 7,300,922 | B2 | 11/2007 | Sullenger et al. |
| 7,304,041 | B2 | 12/2007 | Rusconi |
| 7,611,835 | B2 | 11/2009 | Kim et al. |
| RE43,612 | E | 8/2012 | Anderson et al. |
| 8,470,963 | B2 | 6/2013 | Koltermann |
| 8,586,524 | B2 | 11/2013 | Sullenger et al. |
| 9,340,591 | B2 | 5/2016 | Sullenger et al. |
| 9,468,650 | B2 | 10/2016 | Sullenger et al. |
| 10,066,323 | B2 | 9/2018 | Sullenger et al. |
| 2003/0083294 | A1 | 5/2003 | Sullenger et al. |
| 2003/0143217 | A1 | 7/2003 | Baird et al. |
| 2003/0157030 | A1 | 8/2003 | Davis |
| 2003/0180250 | A1 | 9/2003 | Chauhan et al. |
| 2004/0063654 | A1 | 4/2004 | Davis et al. |
| 2004/0109888 | A1 | 6/2004 | Pun |
| 2005/0136430 | A1 | 6/2005 | Davis |
| 2005/0256071 | A1 | 11/2005 | Davis |
| 2006/0040881 | A1 | 2/2006 | Rusconi |
| 2006/0263435 | A1 | 11/2006 | Davis et al. |
| 2007/0077566 | A1 | 4/2007 | Kim |
| 2008/0199485 | A1 | 8/2008 | Kundig et al. |
| 2008/0267903 | A1 | 10/2008 | Uchegbu et al. |
| 2009/0048193 | A1 | 2/2009 | Rusconi et al. |
| 2009/0082250 | A1 | 3/2009 | Hart et al. |
| 2009/0208501 | A1 | 8/2009 | Visintin et al. |
| 2009/0298710 | A1 | 12/2009 | Farokhzad et al. |
| 2010/0196492 | A1 * | 8/2010 | Green ............... A61P 29/00 514/23 |
| 2010/0210746 | A1 | 8/2010 | Gustafson et al. |
| 2010/0249217 | A1 | 9/2010 | Sullenger et al. |
| 2010/0285081 | A1 | 11/2010 | Chen et al. |
| 2011/0118187 | A1 | 5/2011 | Sullenger et al. |
| 2011/0247772 | A1 * | 10/2011 | Kincaid ............... D21H 11/16 162/149 |
| 2012/0128782 | A1 | 5/2012 | Green et al. |
| 2012/0183564 | A1 | 7/2012 | Sullenger |
| 2013/0266664 | A1 | 10/2013 | Yang et al. |
| 2014/0231357 | A1 | 8/2014 | Ward |
| 2015/0111849 | A1 | 4/2015 | McCrea et al. |
| 2017/0095503 | A1 | 4/2017 | Sullenger et al. |

FOREIGN PATENT DOCUMENTS

| | | | |
|---|---|---|---|
| WO | 2002/053185 | 7/2002 | |
| WO | 2003/002592 | 1/2003 | |
| WO | 2006/040579 | 4/2006 | |
| WO | 2008/000517 | 1/2008 | |
| WO | 2008/063157 | 5/2008 | |
| WO | 2008/121354 | 10/2008 | |
| WO | 2010/020008 | 2/2010 | |
| WO | 2013/040552 | 3/2013 | |
| WO | WO-2014124543 A1 * | 8/2014 | ............ B82Y 30/00 |
| WO | 2014/169043 | 10/2014 | |
| WO | 2015/075669 | 5/2015 | |
| WO | 2015/161094 | 10/2015 | |
| WO | 2017/079638 | 5/2017 | |

OTHER PUBLICATIONS

Avriel A, et al. Admission cell free DNA levels predict 28-day mortality in patients with severe sepsis in intensive care. PLoS One. 2014;9:e100514.

Barrat FJ, et al. Treatment of lupus-prone mice with a dual inhibitor of TLR7 and TLR9 leads to reduction of autoantibody production and amelioration of disease symptoms. Eur J Immunol. 2007;37:3582-6.

Belgrano FS, et al. Role of the acidic tail of high mobility group protein B1 (HMGB1) in protein stability and DNA bending. PLoS One. 2013;8:e79572.

Bhardwaj N, et al. Electrospinning: a fascinating fiber fabrication technique. Biotechnol Adv. 2010;28:325-47.

Binh NG, et al. Polymyxin-B-immobilized-fiber column hemoperfusion with oseltamivir treatment for ARDS due to influenza H1N1/09. Respirol Case Rep. 2015;3:57-60.

Bompiani et al. "Probing the Coagulation Pathway with Aptamers Identifies Combinations that Synergistically Inhibit Blood Clot Formation" (2014) Chemistry & Biology 21: 935-944.

Braza F, et al. Role of TLRs and DAMPs in allograft inflammation and transplant outcomes. Nat Rev Nephrol. 2016;12:281-90.

Brennan TV, et al. Heparan sulfate, an endogenous TLR4 agonist, promotes acute GVHD after allogeneic stem cell transplantation. Blood. 2012;120:2899-908.

Catarino et al., "Quantification of free circulating tumor DNA as a diagnostic marker for breast cancer," (2008) DNA and cell biology 27(8):415-21.

Chase, et al., "Single-stranded DNA binding proteins required for DNA replication," (1986) Ann. Rev. Biochem. 55:103-136.

Chen H, et al. Combination of extracorporeal membrane oxygenation and continuous renal replacement therapy in critically ill patients: a systematic review. Crit Care. 2014;18:675.

(56) References Cited

OTHER PUBLICATIONS

Chen J, et al. Continuous venovenous hemofiltration decreases mortality and ameliorates acute lung injury in canine model of severe salt water drowning. Scand J Trauma Resusc Emerg Med. 2016;24:40.

Cohen MJ, et al. Early release of high mobility group box nuclear protein 1 after severe trauma in humans: role of injury severity and tissue hypoperfusion. Crit Care. 2009;13:R174.

Costa-Silva et al., "Pancreatic cancer exosomes initiate pre-metastatic niche formation in the liver," (2015) Nature Cell Biology 17(6).

Davis et al., "Self-assembling nucleic acid delivery vehicles via linear, water-soluble, cyclodextrin-containing polymers," (2004) Current Med. Chem. 11(2) 179-197.

Didar TF, et al. Improved treatment of systemic blood infections using antibiotics with extracorporeal opsonin hemoadsorption. Biomaterials. 2015;67:382-92.

Feldman N, et al. DAMPs as mediators of sterile inflammation in aging-related pathologies. Ageing Res Rev. 2015;24:29-39.

Fenhammar J, et al. Renal effects of treatment with a TLR4 inhibitor in conscious septic sheep. Crit Care. 2014;18:488.

Fox A, et al. Quantification of circulating cell-free plasma DNA and endothelial gene RNA in patients with burns and relation to acute thermal injury. Burns. 2008;34:809-16.

Fuchs, T. et al., "Extracellular DNA traps promote thrombosis," (2010) PNAS, 107(36):15880-15885.

Gando S, et al. Local hemostasis, immunothrombosis, and systemic disseminated intravascular coagulation in trauma and traumatic shock. Crit Care. 2015;19:72.

Gando S. Hemostasis and thrombosis in trauma patients. Semin Thromb Hemost. 2015;41:26-34.

Garg AD, et al. Danger signalling during cancer cell death: origins, plasticity and regulation. Cell Death Differ. 2014;21:26-38.

Gould TJ, et al. Neutrophil extracellular traps promote thrombin generation through platelet-dependent and platelet-independent mechanisms. Arterioscler Thromb Vasc Biol. 2014;34:1977-84.

Hirasawa H. Indications for blood purification in critical care. Contrib Nephrol. 2010;166:21-30.

Holdenrieder et al., "Clinical Relevance of Circulating Nucleosomes in Cancer," (2008) Annals of the New York Academy of Sciences 1137(1).

Holl et al., "The nucleic acid scavenger polyamidoamine third-generation dendrimer inhibits fibroblast activation and granulation tissue contraction" (2014) Plast Reconstr Surg 134: 420e-33e.

Holl, et al., "Nucleic acid scavenging polymers inhibit extracellular DNA-mediated innate immune activation without inhibiting anti-viral responses," (2013) Plos One, 8(7):1-10.

Ignatova M, et al. Electrospun mats from styrene/maleic anhydride copolymers: modification with amines and assessment of antimicrobial activity. Macromol Biosci. 2010;10:944-54.

International Search Report and Written Opinion for PCT/US2017/068262 dated Feb. 23, 2018. 15 pages.

Ito M, et al. Effects of polymyxin B-immobilized fiber using a rat cecal ligation and perforation model. Asaio J. 2009;55:246-50.

Jain et al., "Nucleic acid scavengers inhibit thrombosis without increasing bleeding," (2012) Proceedings of the National Academy of Sciences 109(32).

Kang JH, et al. An extracorporeal blood-cleansing device for sepsis therapy. Nat Med. 2014;20:1211-6.

Kannemeier, C. et al., "Extracellular RNA constitutes a natural procoagulant cofactor in blood coagulation," (2007) PNAS, 104(15):6388-6393.

Labieniec-Watala M, et al. PAMAM dendrimers: destined for success or doomed to fail? Plain and modified PAMAM dendrimers in the context of biomedical applications. J Pharm Sci. 2015;104:2-14.

Lee et al., "Nucleic acid-binding polymers as anti-inflammatory agents," (2011) Proc. Natl. Acd. Sci. 108(34):14055-60.

Mills KH. TLR-dependent T cell activation in autoimmunity. Nat Rev Immunol. 2011;11:807-22.

Mukherjee SP, et al. Mechanistic studies of in vitro cytotoxicity of poly(amidoamine) dendrimers in mammalian cells. Toxicol Appl Pharmacol. 2010;248:259-68.

Mukherjee SP, et al. Polyamidoamine dendrimer nanoparticle cytotoxicity, oxidative stress, caspase activation and inflammatory response: experimental observation and numerical simulation. Nanomedicine. 2013;9:202-11.

Okun E, et al. Toll-like receptor signaling in neural plasticity and disease. Trends Neurosci. 2011;34:269-81.

Pisetsky, D.S. et al., "Nucleic acid-binding polymers as anti-inflammatory agents: reducing the danger of nuclear attack" (2012) Expert Rev Clin Immunol. 8(1):1-3.

Tang C, et al. Electrospinning of poly(styrene-co-maleic anhydride) (SMA) and water-swelling behavior of crosslinked/hydrolyzed SMA hydrogel nanofibers. Polymer. 2007;48:4482-91.

Venereau E, et al. DAMPs from Cell Death to New Life. Front Immunol. 2015;6:422.

Wiersinga WJ. Current insights in sepsis: from pathogenesis to new treatment targets. Curr Opin Crit Care. 2011;17:480-6.

Zhang Q, et al. Circulating mitochondrial DAMPs cause inflammatory responses to injury. Nature. 2010;464:104-7.

\* cited by examiner

POLYCATIONIC MICROFIBERS AND METHODS OF USING THE SAME

CROSS-REFERENCE TO RELATED APPLICATIONS

This patent application is a national stage filing under U.S.C. 371 of International Application No. PCT/US2017/068262, filed Dec. 22, 2017, which claims the benefit of priority of U.S. Provisional Patent Applications Nos. 62/451,863, filed Jan. 30, 2017, and 62/437,802, filed Dec. 22, 2016, the contents of each are incorporated herein by reference in their entirety.

STATEMENT OF GOVERNMENT SUPPORT

This invention was made with government support under U19AI067773 and U19AI067798 awarded by National Institutes of Health. The government has certain rights in the invention.

BACKGROUND

Damage associated molecular patterns (DAMPs) are molecules released from damaged cells or extracellular matrix. Upon injury of tissues, DAMPs are released into the blood and tissue fluid. These DAMPs play a key role in healing damaged tissues and protecting against infection [1]. They are recognized by pattern recognition receptors (PRRs) expressed in mammalian cells. Upon binding to DAMPs, PRRs trigger intracellular signal cascades and lead to activation of transcription factors, including nuclear factor-κB (NF-κB), activator protein 1 (AP1) and interferon regulatory factor (IRF), which elicit expression of inflammatory cytokines, type I interferons (IFN) and IFN-inducible genes [2]. Elevated levels of plasma DAMPs have been observed in patients with traumatic injuries and were strongly correlated with the development of severe posttraumatic complications, e.g., systemic inflammatory response syndrome (SIRS), multiple organ dysfunction and thrombosis [3, 4].

Unlike other PRRs, toll-like receptors (TLRs) are membrane-associated proteins and predominantly expressed in immune and inflammatory cells [5]. A particular TLR is able to recognize a specific molecular pattern associated with a virus, bacteria and/or damaged tissues. For instance, TLRs 2, 4, 5, 6 and 11 bind to bacterial membrane-associated molecules (e.g., lipoprotein and lipopolysaccharide (LPS)), cellular membrane-associated molecules (e.g., heparan sulfate) and nuclear proteins (e.g., high mobility group box 1 protein (HMGB1) and histones), whereas TLRs 3, 7, 8 and 9 recognize bacterial, viral and cellular DNAs and RNAs [6].

TLRs act as the sentinel of the innate immune system that protects against pathogens. Inappropriate activation of TLRs, on the other hand, contributes to the development of a variety of diseases, including autoimmune and inflammatory diseases [7, 8], cardiovascular diseases [9], sepsis [10], neuronal diseases [11] and cancer [12]. Inhibition of single or dual TLRs using receptor antagonists has been demonstrated to attenuate disease progression in some pre-clinical studies [13-15]. However, the interconnectedness and redundancy of TLR signaling is likely to limit the therapeutic efficacy of single or dual TLR inhibitors.

In previous studies, we and others demonstrated that certain types of polycationic polymers, sometime referred to as nucleic acid-binding polymers (NABPs), such as third-generation polyamidoamine dendrimer (PAMAM-G3) are able to neutralize the ability of cell-free DNAs and RNAs to activate nucleic acid-sensing TLRs (e.g., TLR3, TLR7, TLR8 and TLR9) [16] and blood coagulation [17, 18]. One potential concern with soluble NABP therapy is that NABPs show dose-dependent toxicity in vivo [19]. Since NABPs are originally designed to deliver genes and siRNAs into cells, they are readily uptaken by cells, damage intracellular organelles, and can induce cell death [20-22]. Moreover, the NABPs cannot neutralize the ability of non-nucleic acid DAMPs to induce immune stimulation [16].

NABPs bound onto poly(styrene-co-maleic anhydride) (PSMA) have been shown to reduce or eliminate toxicity. [International Patent Publication No. WO 2014/169043] However, nanofibers prepared with only PSMA have small cross-sectional diameters of less than about 1 μm and are torn easily when exposed to aqueous fluids.

As a result, there is a need for improved materials and methods for sequestering NABPs from live cells to limit systemic exposure and improve the ability of NABPs to remove additional DAMPs.

SUMMARY OF THE INVENTION

Disclosed herein are polycationic microfibers that are capable of sequestering or clearing certain molecules, complexes, or supramolecular assemblies from fluids, including bodily fluids and biological samples. Examples of molecules, complexes, and supramolecular assemblies capable of being sequestered or cleared, include nucleic acids, proteins, polysaccharide, glycosaminoglycan, biomolecular complexes, exosomes, or microparticles. As a result, the polycationic microfibers disclosed herein are useful for the treatment of organ transplant donors or organ transplant recipients or for the treatment of or the prevention of thrombosis, sepsis, inflammatory diseases, autoimmune diseases, cardiovascular diseases, and cancers. The polycationic microfibers comprise a high-aspect-ratio polymeric core, the polymeric core comprising a blend of a first core polymer and a second core polymer, and a polycationic polymer immobilized on the surface of the polymeric core.

An aspect of the invention is that the polycationic microfibers may be formed into filters capable of sequestering or clearing certain molecules, complexes, or supramolecular assemblies from fluids. The filters comprise any of the polycationic microfibers described herein formed into a porous mesh.

Another aspect of the invention is that the polycationic microfibers or polycationic microfiber filters may be integrated with an extracorporeal filtration apparatus for sequestering a nucleic acid, a protein, a polysaccharide, a glycosaminoglycan, a biomolecular complex, an exosome, or a microparticle from a subject in need of a treatment for a disease or a condition or for the prevention of the onset of a disease or condition. The extracorporeal filtration apparatus comprises a first end of a blood line configured to interface with a first blood vessel of the subject for the removal of blood from the subject; a second end of the blood line configured to interface with a second blood vessel of the subject for the return of blood to the subject; a blood pump positioned along the blood line between the first end and the second end configured for the extracorporeal circulation of blood from the first end to the second end; and any of the polycationic microfibers or filters described herein positioned along the blood line between the first end and the second end configured to bind or sequester the nucleic acid, the protein, the polysaccharide, the glycosaminoglycan, the biomolecular complex, the exosome, or the microparticle from the subject.

Another aspect of the invention is that the polycationic microfibers or filters, or filtration apparatuses may be integrated with ex vivo perfusion or filtration machines for sequestering a nucleic acid, a protein, a polysaccharide, a glycosaminoglycan, a biomolecular complex, an exosome, or a microparticle from a tissue, graft, or organ. The machines comprise a housing configured to host a tissue, a graft, or a organ; a first end of a line configured to interface with the tissue, the graft, or the organ and allow for the introduction of a perfusate to the tissue, the graft, or the organ; a second end of the line configured to interface with the tissue, the graft, or the organ and allow for the removal of the perfusate from the tissue, the graft, or the organ; a pump positioned along the line between the first end and the second end configured for the circulation of the perfusate from the second end to the first end; and a filter comprising a polycationic microfiber formed into a porous mesh positioned along the line between the first end and the second end, wherein the polycationic microfiber is configured to bind or sequester a nucleic acid, a protein, a polysaccharide, a glycosaminoglycan, a biomolecular complex, a exosome, or a microparticle in the perfusate.

Another aspect of the invention is that the polycationic microfibers, filters, or filtration apparatuses may be used in methods for sequestering nucleic acids, proteins, polysaccharides, glycosaminoglycans, biomolecular complexes, exosome, or microparticles from a solution or a sample. The methods comprise contacting a solution or a sample comprising the nucleic acid, the protein, the polysaccharide, the glycosaminoglycan, the biomolecular complex, the exosome, or the microparticle with any of the polycationic microfibers, filters, or filtration apparatuses described herein. Alternative methods comprise contacting a solution or a sample comprising the nucleic acid, the protein, the polysaccharide, the glycosaminoglycan, the biomolecular complex, the exosome, or the microparticle and a polycationic polymer with a high-aspect-ratio polymeric core.

Another aspect of the invention includes methods of treating a subject suffering from a disease or condition, the method comprising administering a therapeutically effective amount of a solute-cleared fluid to the subject, wherein the solute-cleared fluid is prepared from a bodily fluid.

Another aspect of the invention includes methods for the prevention of a disease or a condition in a subject, the method comprising administering an effective amount of a solute-cleared fluid to the subject following organ transplantation, wherein the solute-cleared fluid is prepared from a bodily fluid.

Additional embodiments of the aspects of the invention will be described in detail below.

DESCRIPTION OF THE FIGURES

FIGS. 4A-4F show NABP-immobilized PSMA/polystyrene microfiber mesh scavenges multiple TLR agonists without cytotoxicity. FIG. 4A shows a scanning electron microscope (SEM) image of surface of PSMA/polystyrene microfiber mesh. FIG. 4B shows NF-kB activation in cells incubated in complete culture media (1 ml) supplemented with TLR agonists Pam3CSK4, LPS, Heparan sulfate (HS), polyI:C or CpG ODN incubated for 1 min with or without either PEI- or PAMAM-G3-immobilized microfiber mesh (2.9 cm$^2$) at room temperature. The treatment was repeated once. TLR reporter cells were incubated for 3 days in either untreated or treated complete culture media. For the treatment with free NABPs, TLR reporter cells in the complete culture media containing fetal bovine serum and TLR agonist were directly treated with either PEI (20 μg/ml) or PAMAM-G3 (25 μg/ml). The activation of NF-kB in TLR signaling pathway was determined by a colorimetric enzyme assay. FIGS. 4C-4F show cell proliferation of human primary fibroblasts cultured in either complete culture media containing free (FIG. 4C) PEI or free (FIG. 4D) PAMAM-G3 at various concentrations or complete culture media pre-treated with (FIG. 4E) PEI-immobilized mesh or (FIG. 4F) PAMAM-G3-immobilized mesh at various surface areas (0.288 mg/cm$^2$ PEI on mesh; 0.128 mg/cm$^2$ PAMAM-G3 on mesh). After 3 days incubation, cell proliferation was determined by a MTS (3-(4,5-dimethylthiazol-2-yl)-5-(3-carboxymethoxyphenyl)-2-(4-sulfophenyl)-2H-tetrazolium) assay. Error bars are S.D. *Significant different (P<0.05), vs untreated group.

FIGS. 5A-5B show DAMPs were generated from human and mouse cells that were killed by either sonication or doxorubicin. (FIG. 5A) TLR4 and (FIG. 5B) TLR9 reporter cell lines were stimulated overnight with human DAMPs (20% v/v) with or without treatment with either PEI-immobilized mesh (5.8 cm$^2$) or PAMAM-G3 (25 μg/ml). FIG. 5C shows TLR9 reporter cells after stimulation with DAMPs pre-treated with PEI-immobilized mesh at various surface sizes. The activation of NF-kB in TLR signaling pathway was determined by a colorimetric enzyme assay. FIGS. 5D-5E show cytokine induction after a mouse macrophage cell line was incubated overnight with mouse DAMPs pre-treated with PEI-immobilized DAMPs at various surface sizes. (FIG. 5D) TNF-α and (FIG. 5E) IFN-β production by the cells were determined by ELISA. FIG. 5F shows TLR activation of bacterial PAMPs pre-treated with or without PEI-immobilized mesh (5.8 cm$^2$). TLR3, TLR4 and TLR9 reporter cell lines were stimulated overnight with the untreated or treated PAMPs (5% v/v). Error bars are S.D. *Significant different (P<0.05), between indicated groups or compared with untreated.

FIG. 7A shows TLR2, TLR3, TLR4 and TLR9 reporter cells were incubated overnight with sera (20% v/v) isolated from either trauma patients or normal healthy volunteers. FIG. 7B shows undiluted serum was treated with or without either PEI-immobilized microfiber mesh (8.7 cm$^2$) or PAMAM-G3 (25 µg/ml). NF-κB activation in the TLR reporter cell lines was determined by a colorimetric assay. Error bars are S.D. *P<0.05. *P<0.01.

FIGS. 8A-8B shows clotting time of platelet-depleted plasma from human and mouse normal blood after incubation with the DAMPs (10% v/v) and measurement of the clotting time. FIG. 8C shows the effect on clotting time when mouse whole blood was incubated with the DAMPs at various dilutions with PBS. The coagulation (R) time was detected by Thromboelastography (TEG). FIGS. 8D-8E show donor hearts isolated from normal mice (n=3) after perfusion with the DAMP (2 ml), followed by heterotrophic heart transplantation (FIG. 8D) or in which DAMPs had been captured and removed for 10 minutes (FIG. 8E). Heart beating and thrombosis of the donor heart was monitored. The image was captured 30 min after unclamping. FIG. 8F shows representative sections from untreated, DAMP-treated, and PEI-immobilized mesh-filtered DAMP-treated allografts harvested 30 min after unclamping. All were stained with either tissue factor or Carstairs (modified Masson's trichrome) to visualize platelets (purple), erythrocytes (clear yellow/orange), and fibrin (Bright red/orange) taken at ×100 magnification. Data represent three independent experiments. Error bars are S.D. NS: statistically non-significant. *P<0.05. **P<0.01.

DETAILED DESCRIPTION OF THE INVENTION

Figure 1:
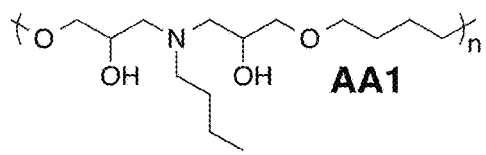
FIG. 1 shows the structures of some of the candidate polymers (n is 1 to 500).
Figure 1:
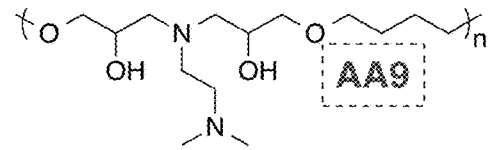
Figure 1:
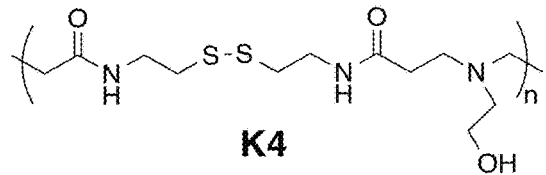
Figure 1:
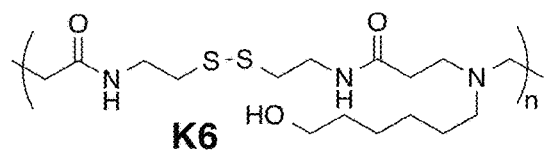
Figure 1:
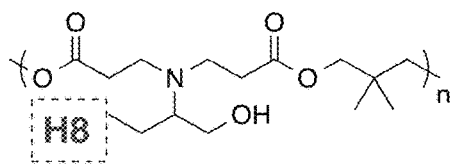
Figure 1:
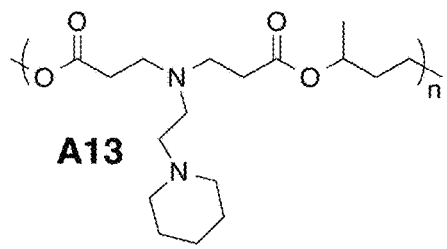
Figure 1:
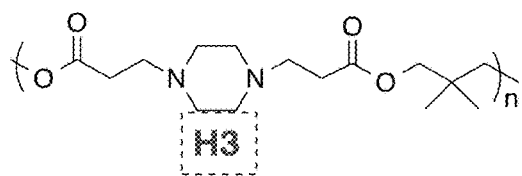
Figure 1:
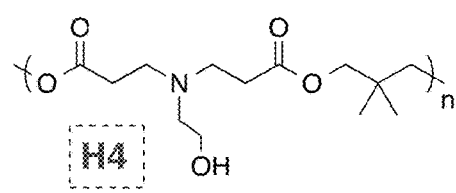
Figure 1:
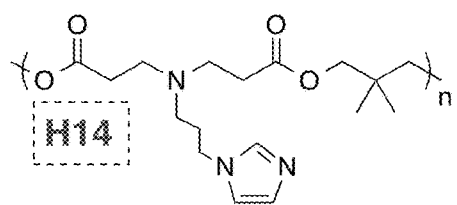
Figure 1:
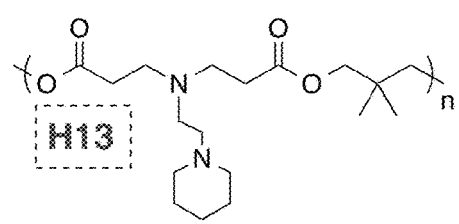
Figure 1:
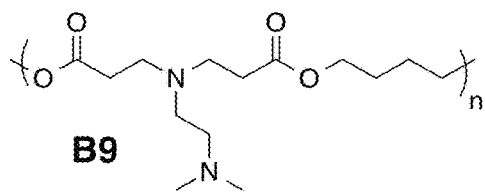
Figure 1:
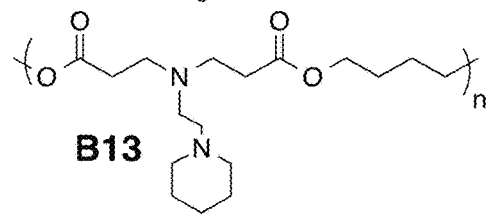
Figure 1:
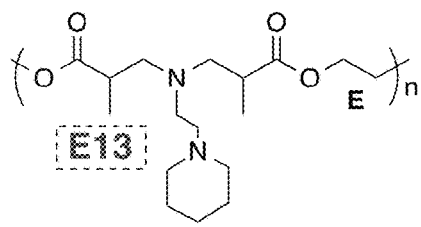

Herein we disclose polycationic microfibers that are capable of sequestering or clearing certain solutes or particles from solution or components from multicomponent fluids. Examples of solutes and particles that can be sequestered or cleared include, but are not limited to, nucleic acids, proteins, polysaccharide, glycosaminoglycan, supramolecular assemblies, e.g., biomolecular complexes, microparticles, or exosomes. For example pathogen associated molecular patterns (PAMPs) and damage-associated molecular patterns (DAMPs) are biomolecules that may result in inflammation which can be cleared using the methods and compositions provided herein. As a result, these polycationic microfibers may be used as filters or in filtration apparatuses. Moreover, these polycationic microfibers may be useful for preparing solute-cleared and/or particulate-cleared fluids and solutions that, in turn, may be useful for the treatment of certain diseases or conditions or for the prevention of certain diseases or conditions.

Although fibers comprising immobilized polycationic polymers have been disclosed in the art (International Patent Publication No. WO 2014/169043), nanofibers prepared with only a PSMA central core have small cross-sectional diameters of less than about 1 µm and are torn easily when exposed to aqueous fluids. Because the PSMA nanofibers can tear easily, the PSMA nanofibers are unsuitable for certain applications. The present disclosure improves on prior technology by blending at least two different polymers to form the central core of a microfiber. The resulting fibers have larger cross-sectional diameters, greater tensile and/or shear strength in aqueous environments, or are more resilient to damage or degradation than nanofiber cores composed of only PSMA.

As used herein "complex fluid" may be any multicomponent fluid system having a primary liquid medium and a minor component dispersed within the primary liquid medium. Solutions, colloidal systems, and suspensions are each complex fluids. For a liquid solution, the primary liquid medium is a solvent while the minor component is a solute dissolved by the solvent. For a colloidal system, the minor component is a molecule or polymolecular particle having a dimension roughly between 1 nm and 1 micron in at least one direction that is dispersed in a primary liquid medium. Similarly, a suspension comprises a particle, typically larger than 1 micron, dispersed in a primary liquid medium. Depending on the context, a complex fluid may be simultaneously a solution, colloidal system, and a suspension. One example is blood. Blood also contains various minor components having differing lengths scales dispersed within an aqueous medium that may lead one to characterize blood as a solution in one context but a colloidal system or suspension in another. For example, blood contains dissolved small molecules, such as salts, sugars, fats, and vitamins, colloidal-sized molecules and particles having dimensions between about 1 nm and 1 micron, such as proteins or exosomes, and blood cells having a dimension larger than 1 micron. As a result, "solution," "colloidal system," or "suspension" may be used synonymously with any complex fluid regardless of whether it may more typically be referred as a different type of complex fluid. Similarly, "solute," "particle", "microparticle," or any other similar term for a minor component dispersed within a primary liquid medium may be used synonymously with any other term for a minor component regardless of whether it may more typically be referred as a different type of minor component. Moreover, "solute-cleared fluid" or "particle-cleared fluid" may be used synonymously with any complex fluid filtrate having a reduced number of minor components dispersed within the primary liquid medium after the complex fluid comes into contact with a polycationic microfiber or filter comprising the polycationic microfiber.

Examples of complex fluid include, without limitation, solutions created by human intervention or a biological sample obtained from a subject or a patient. When the solution is a biological sample obtained from a subject or a patient, the solution may be blood, lymph, plasma, serum, cerebral spinal fluid, urine or any other bodily fluid. In certain embodiments, the solution may be organ preservation solution (e.g., UW solution, saline or machine perfusion solution).

Examples of minor components dispersed within a primary liquid medium include, without limitation, nucleic acids, proteins, polysaccharide, glycosaminoglycan, supramolecular assemblies, e.g., biomolecular complexes, microparticles, exosomes, or any other minor component capable of binding with any of the polycationic microfibers or filters described herein.

Polycationic Microfibers

As used herein polycationic microfibers include a high-aspect-ratio polymeric core, the polymeric core having a cross-sectional diameter of at least a micron, and a polycationic polymer immobilized on the surface of the polymeric core. In certain embodiments, the polymeric core has a cross-sectional diameter between about 1.0 micron and about 1.0 millimeter. In particular embodiments, the polymeric cores have a cross-sectional diameter between about 2.0 microns to about 10.0 microns. The polymeric core may be electrically neutral.

The polymeric core may comprise a blend of a first core polymer and a second core polymer, where the first core polymer and the second core polymer are different polymers. The first core polymer and/or the second core polymer may be a homopolymer or a copolymer. In some embodiments, the first core polymer is a copolymer and the second core polymer is a homopolymer. Copolymers may be an alternating copolymer, a block copolymer, or a random copolymer comprising a residue of a first monomer and a residue of a second monomer. In some embodiments, the first core polymer, the second core polymer, or both the first core polymer and the second core polymer have polar and/or hydrophilic residues. In some embodiments, the first core polymer, the second core polymer, or both the first core polymer and the second core polymer have apolar and/or hydrophobic residues. In certain embodiments where a core polymer is a copolymer, the first core polymer, the second core polymer, or both the first core polymer and the second core polymer have both (i) polar and/or hydrophilic residues and (ii) apolar and/or hydrophobic residues. In certain embodiments where a core polymer is a copolymer, the polycationic polymers may be preferentially immobilized on the residue of the first monomer or the second monomer. In some embodiments, a residue of the first core polymer and a residue of the second core polymer are the same residue. In some embodiments, a residue of the first core polymer and a residue of the second core polymer are different residues.

In some embodiments, polar and/or hydrophilic monomers may be any polar and/or hydrophilic monomers capable of being polymerized. In particular embodiments, polar and/or hydrophilic monomers may be any of the following monomers: acrylic acid, acrylate, acrylamide, and maleic anhydride, allylamine, ethyleneimine, 2-ethyl-2-oxazoline, 2-methyl-2-oxazoline, vinyl alcohol, vinylpyrrolidone, ethylene glycol, propylene glycol, ethylene oxide, methacrylate, methacrylic acid, N-acryloylmorpholine, beta-carboxyethyl acrylate, diethylene glycol diacrylate, diethylene glycol dimethacrylate, ethylene Glycol Dimethacrylate, hydroxypolyethoxy (10) allyl ether, (HEMA 10) poly ethoxy (10) ethyl methacrylate, or sulfone.

In some embodiments, apolar and/or hydrophobic monomers may be any apolar and/or hydrophobic monomers capable of being polymerized. In particular embodiments, apolar and/or hydrophobic monomers may be any of the following monomers: styrene, stearyl acrylate, N-(n-Octadecyl)acrylamide, t-amyl methacrylate, butyl methacrylate, benzyl acrylate, decyl methacrylate, decyl acrylate, cyclohexyl acrylate, cyclohexyl methacrylate, bis(2-methacryloxyethyl)-N,N'-1,9-nonylene biscarbamate, 2,2-bis(4-methacryloxyphenyl) propane, or propylene.

A polymer blend may have any weight ratio of the first core polymer to the second core polymer that allows for the formation of a high-aspect-ratio microfiber. In certain embodiments, the weight ratio of the first core polymer to the second core polymer is about 5:1 to about 1:5. In particular embodiments, the weight ratio of the first core polymer to the second core polymer is about 4:1 to about 1:4, about 3:1 to about 1:3, about 2:1 to about 1:2, or about 1.5:1 to about 1:1.5.

The first core polymer and second core polymer may each be characterized by a weight-average molecular weight (Mw) or any other suitable weight, and the ratio of the Mw of the first core polymer to the Mw of the second core polymer may be any suitable ratio that allows for the formation of a high-aspect ratio microfiber. In certain embodiments, the ratio is about 3:1 to about 1:3. In particular embodiments, the ratio is about 2:1 to about 1:2 or about 1.5:1 to about 1:1.5.

Polycationic polymers, which are sometimes referred to as nucleic-acid scavenging polymers, are polymers having a plurality of cationic termini, a focal point or bridging moiety, and a branched cationic polymer between the focal point or the bridging moiety and the cationic termini. The polycationic polymers may be a dendrimer or a dendron.

Dendrimers or dendrons may be characterized by the generation number Gn. The generation number details the number of successive additions of the polymer's base monomer. The generation number (Gn) may characterize the polycationic polymers properties depending on the choice of the polymer. Properties characterizable by knowledge of the generation number and the cationic polymer include, without limitation, the number of branch points, the size of the dendron, the electronic charge, and terminal moieties. In certain embodiments, the dendron or dendrimer has a generation number of G2, G3, G4, G5, G6, or any Gn suitable for use as a scavenger of nucleic acids, proteins, or supramolecular assemblies, such as biomolecular complex, exosomes, or microparticles.

Figure 2:
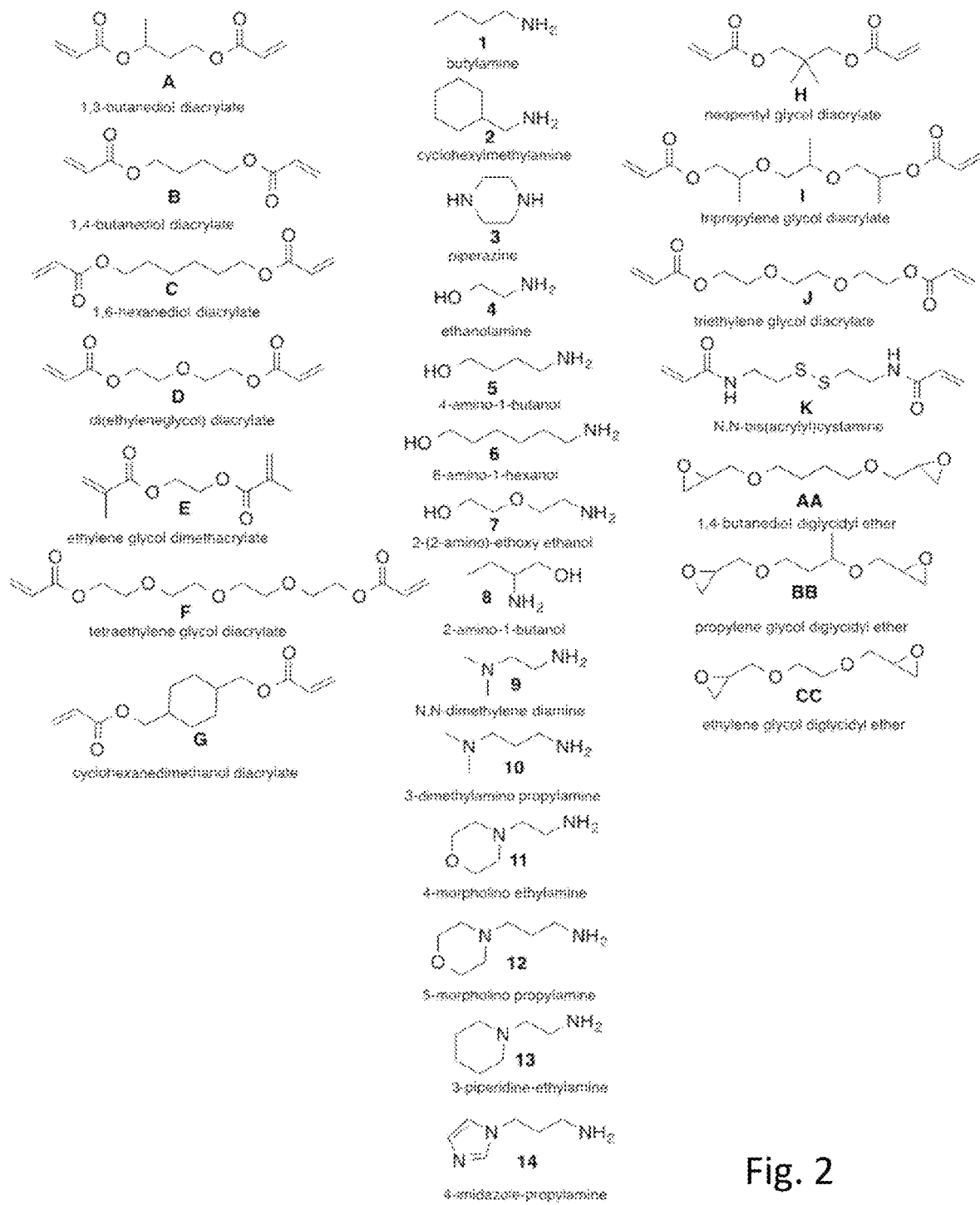
FIG. 2 shows the monomer structures used to generate the nucleic acid-binding polymer combinatorial library. The lettered structures (A-K and AA-CC) represent the backbone.
Figure 3:
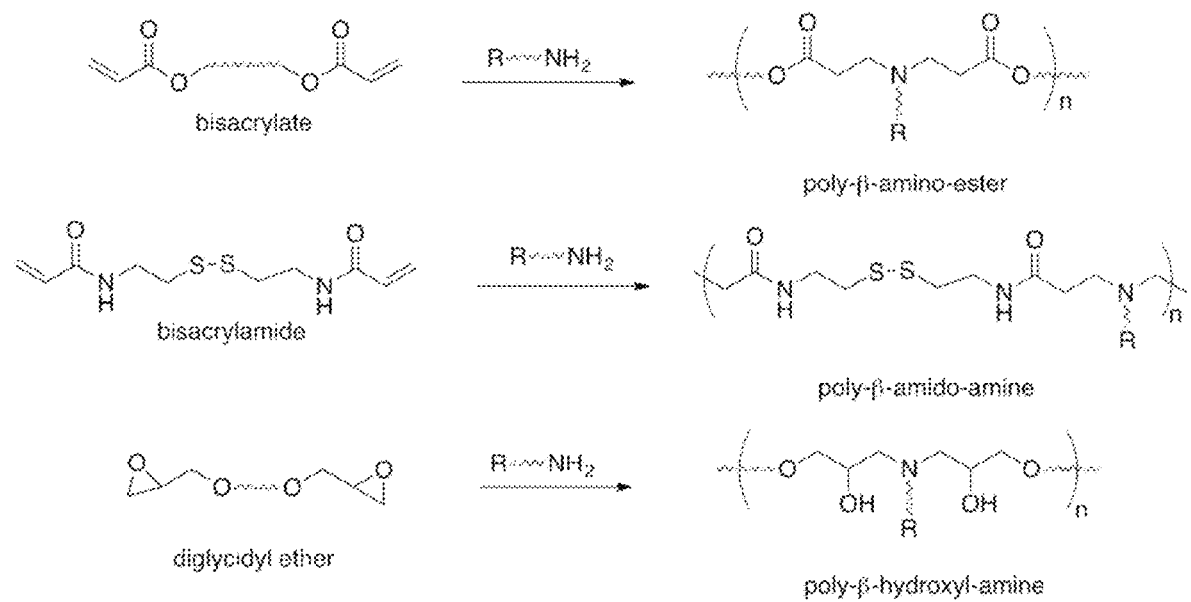
FIG. 3 is a set of synthetic schemes for generation of the combinatorial polycationic polymer library. Michael Addition of primary or secondary amines to acrylate/acrylamide or epoxide ring opening of glycidyl ethers by primary or secondary amines was used to generate the polymers in the library. In generation of the libraries size was not a selection criterion. Thus n is, for example, 1 to 500.

In some embodiments, the polycationic polymer is selected from the group consisting of a poly(β amino ester), disulfide containing poly(β amido amine) or poly(β hydroxyl amine). Preferred polymers include those in FIG. 1, particularly preferred are AA9, H3, H4, H8, H13 and H14 where "n" is, for example, 1 to 500, preferably, 5 to 250, more preferably, 10-200, 20-150 or 30-100. Other suitable polymers include A1, A2, A6, A9, A13, A14, B5, B6, B8, B9, B13, E13, F6, F8, F9, H2, H3, H4, H6, H7, H8, H9, H13, H14, I1, I13, K4, K6, K9, K14, AA1, AA9, and BB1. For each of the listed polymers the backbone is the structure listed as A-K or AA-CC as shown in FIG. 2 and the monomer side chain has the structure indicated as 1-14 in FIG. 2. The polymers are made from the monomers shown in FIG. 1 using the reactions shown in FIG. 3 to generate the polymers listed. From the results in the Example the most suitable backbone polymers were A, B, H, K and AA and the most suitable side chain monomer linkers were 1, 6, 8, 9, 13 and 14. Cationic polymers of the invention include biodegradable and non-biodegradable polymers and blends or copolymers thereof. Several of these are further exemplified in International Pub. Nos. WO/2014/169043 and WO/2017/079638, the contents of which are incorporated herein by reference.

The polycationic polymer is suitably a polycationic polymer capable of binding to a nucleic acid, a protein, a polysaccharide, a glycosaminoglycan, a biomolecular complex, an exosome, and/or a microparticle. Preferred polycationic polymers include biocompatible polymers (that is, polymers that do not cause significant undesired physiological reactions) that can be either biodegradable or non-biodegradable polymers or blends or copolymers thereof. Branched polyethylenimine (PEI) and PAMAM G3 was used in the examples, but other polycationic polymers are anticipated to achieve similar effects. Examples of such polymers include, but are not limited to, polycationic biodegradable polyphosphoramidates, polyamines having amine groups on either the polymer backbone or the polymer side chains, nonpeptide polyamines such as poly(aminostyrene), poly(aminoacrylate), poly(N-methyl aminoacrylate), poly(N-ethylaminoacrylate), poly(N,N-dimethyl aminoacrylate), poly(N,N-diethylaminoacrylate), poly(aminomethacrylate), poly(N-methyl amino-methacrylate), poly (N-ethyl aminomethacrylate), poly(N,N-dimethyl aminomethacrylate), poly(N,N-diethyl aminomethacrylate), poly(ethyleneimine), polymers of quaternary amines, such as poly(N,N,N-trimethylaminoacrylate chloride), poly(m-ethyacrylamidopropyltrimethyl ammonium chloride); natural or synthetic polysaccharides such as chitosan, cyclodextrin-containing polymers, degradable polycations such as poly[alpha-(4-aminobutyl)-L-glycolic acid] (PAGA); polycationic polyurethanes, polyethers, polyesters, polyamides, polybrene, etc. Particularly preferred cationic polymers include PEI, CDP, CDP-Im, PPA-DPA, PAMAM and HDMBr. (See U.S. Pat. Nos. 9,340,591, 7,270,808, 7,166,302, 7,091,192, 7,018,609, 6,884,789, 6,509,323, 5,608,015, 5,276,088, 5,855,900, U.S. Published Appln. Nos. 2012/0183564, 20060263435, 20050256071, 200550136430, 20040109888, 20040063654, 20030157030, International Patent Publication No. WO 2014/169043, Davis et al, Current Med. Chem. 11(2) 179-197 (2004), and Comprehensive Supramolecular Chemistry vol. 3, J. L. Atwood et al, eds, Pergamon Press (1996). In some embodiments, the polycationic polymer may be configured to chemiosorp on the surface of the polymeric core. The polycationic polymer may comprise a crosslinkable moiety capable of crosslinking with a crosslinkable moiety on the surface of the polymeric core when the crosslinkable moieties are contacted. The crosslinkable moiety on the polycationic polymer or the polymeric core may be a sulfhydryl, carbonyl, carboxyl, amine, maleimide, haloacetyl, pyridyl disulfide, thiosulfonate, vinylsulfone, hydrazide, alkoxyamine, carbodiimide, isothiocyanates, isocyanates, acyl azides, N-Hydroxysuccinimide ester, sulfonyl chloride, glyoxal, epoxide, oxirane, carbonate, aryl halide, imidoester, carbodiimide, anhydride, and fluorophenyl ester, or any other crosslinkable moiety.

In some embodiments, the polycationic polymer may be configured to physiosorp on the surface of the polymeric core. The polycationic polymer may comprise a binding moiety capable of binding with a binding moiety on the surface of the polymeric core when the binding moieties have an affinity for each. The binding moiety on the polycationic polymer or the polymeric core may be biotin, a biotin-binding moiety, avidin, an avidin-binding moiety, an antigen, an antigen-binding moiety, an antibody, or an antibody-binding moiety.

The plurality of cationic termini may be any terminal moieties that allow for the binding of a variety of molecules and/or supramolecular assemblies, including nucleic acids, proteins, polysaccharide, glycosaminoglycan, biomolecular complexes, exosome, and/or microparticles. The polycationic polymers bind to a wide array of different nucleic acids including ssRNA, ssDNA, dsRNA and dsDNA and which may be presented in a complex with protein such as viral proteins, histones, HMGB1, anti-nuclear antibody, RNA-sensing pattern recognition receptors (e.g. MDAS, RIG-I, TLR3, TLR7, TLR8, PKR) and DNA-sensing pattern recognition receptors (e.g., TLR9, AIM2 and STING). The polycationic polymer also binds DAMPs (damage associated molecular pattern) and PAMPS (pathogen-associated molecular pattern) as well as other inflammatory mediators. The polycationic polymer may bind any of the aforementioned molecules or supramolecular assemblies to the corona of a dendrimer or dendron. Under certain conditions, the plurality of cationic termini may assist to effectively bind the molecules or supramolecular assemblies irreversibly. Under certain conditions, the plurality of cationic termini may assist to effectively bind the molecules or supramolecular assemblies reversibly.

Advantageously, the binding affinity of a polycationic polymer of the invention for a nucleic acid, expressed in terms of Kd, is in the pM to mM range, preferably, less than or equal to 50 nM; expressed in terms of binding constant (K), the binding affinity is advantageously equal to or greater than $10^5$ $M^{-1}$, preferably, $10^5$ $M^{-1}$ to $10^8$ $M^{-1}$, more preferably, equal to or greater than $10^6 M^{-1}$. Thus, the binding affinity of the sequence-independent nucleic acid-binding cationic polymers can be, for example, about $1 \times 10^5$ $M^{-1}$, $5 \times 10^5$ $M^{-1}$, $1 \times 10^6$ $M^{-1}$, $5 \times 10^6$ $M^{-1}$, $1 \times 10^7$ $M^{-1}$, $5 \times 10^7$ $M^{-1}$; or about 10 pM, 100 pM, 1 nM, 10 nM, 100 nM, 1 μM, 10 μM, 100 μM. "K" and "Kd" can be determined by methods known in the art, including Isothermal calorimetry (ITC), Forster Resonance Energy Transfer (FRET), surface plasmon resonance or a real time binding assay such as Biacore.

Conditions such as pH, presence or absence of salts, and/or temperature may affect the electronic character of the polycationic polymer and are within the scope of the invention. Depending on the conditions for using the polycationic polymer, the plurality of termini or the branched polymer between a focal point or a bridging moiety and the plurality of termini may be electrically neutral. Under some conditions, the polycationic polymer has a plurality of electrically neutral termini and a branched cationic polymer between a focal point or a bridging moiety and the plurality of electrically neutral termini. Under some conditions, the polycationic polymer has a plurality of cationic termini and a branched electrically neutral polymer between a focal point or a bridging moiety and the plurality of cationic termini.

In some embodiments, the polycationic polymer is a conjugated polycationic polymer. The conjugated polycationic polymers comprise a dendron having a focal point, a plurality of cationic termini, and a branched cationic polymer between the focal point and the plurality of cationic termini, a detectable label, and a crosslinker that links the detectable label and the focal point of the dendron. The conjugated polycationic polymers have the ability to bind to negatively charged molecules, such as nucleic acids or nucleic acid-protein complexes, to sequester the negatively charged molecules and/or prepare a trackable adjunct.

The detectable label may be a binding label, a chromophore, an enzyme label, a bioluminescent label, a quencher, a radiolabel, or any other label suitable for a means of detection. Binding labels provide for a detectable signal via a binding event. In some embodiments, a binding label may be biotin, an antibody, an antigen, or any other label capable of providing a detectable signal via a binding event. Chromophores provide a detectable signal via the absorbance and emission of photons. In some embodiments, the chromophore is a fluorophore, a phosphor, a dye, a quantum dot, or any other chromophore capable of absorbing and emitting detectable photons. In certain embodiments, the chromophore is an Alexa Fluor such as Alexa Fluor 488 or Alexa Fluor 750. Enzyme labels provide a detectable signal via a reaction with a substrate. Bioluminescent labels provide a detectable signed via the emission of light from a protein. In certain embodiments, the bioluminescent label is a luciferase. Quenchers provide a detectable signal via the modulation of the photon emission from a chromophore. Radiolabels provided for a detectable signal via a radioactive decay.

In some embodiments, binding moieties on the polymeric core and the detectable label of the conjugated cationic polymer have an affinity sufficient to immobilize the conjugated cationic polymer. The binding moiety may be avidin, an antibody, or any other binding protein. When avidin is used as a binding moiety, the detectable label is an avidin-binding label. In particular embodiments when avidin is used as a binding moiety, the detectable label is biotin. When an antibody is used as a binding moiety, the detectable label is an antibody-binding label. In particular embodiments when an antibody is used as a binding moiety, the detectable label may be an antigen.

The binding moiety may also be a binding moiety that binds a protein. In particular embodiments, the binding moiety may be biotin or an antigen. When biotin is used as a binding moiety, the detectable label may be a biotin-binding label. In particular embodiments when biotin is used as a binding moiety, the detectable label is avidin. When an antigen is used as a binding moiety, the detectable label may be an antigen-binding label. In particular embodiments when an antigen is used as a binding moiety, the detectable label is an antibody.

In an alternative embodiment, the conjugated polycationic polymer chemisorps to the polymeric core. The polycationic polymers comprise a dendron, the dendron comprising a focal point, a plurality of cationic termini, and a branched cationic polymer between the focal point and the plurality of cationic termini, and a crosslinker, wherein the crosslinker links the substrate and the focal point of the dendron. The dendron may further comprise a first crosslinkable moiety, the substrate comprises a second crosslinkable moiety, the second crosslinkable moiety capable of crosslinking with the first crosslinkable moiety; and the crosslinker is prepared by contacting the first crosslinkable moiety with the second crosslinkable moiety. In certain embodiments, the first crosslinkable moiety or the second crosslinkable moiety comprises a member selected from the group consisting of sulfhydryl, carbonyl, carboxyl, amine, maleimide, haloacetyl, pyridyl disulfide, thiosulfonate, vinylsulfone, hydrazide, alkoxyamine, carbodiimide, isothiocyanates, isocyanates, acyl azides, N-Hydroxysuccinimide ester, sulfonyl chloride, glyoxal, epoxide, oxirane, carbonate, aryl halide, imidoester, carbodiimide, anhydride, and fluorophenyl ester.

Polycationic Microfiber Filters

Another aspect of the invention is a polycationic filter comprising a polycationic fiber formed into a porous mesh. The filter may be configured to bind or sequester a nucleic acid, a protein, a polysaccharide, a glycosaminoglycan, a biomolecular complex, an exosome, or a microparticle from a solution or a sample. In particular embodiments, the mesh is ordered, i.e., has a regular pattern. Ordered meshes may be prepared in a number of different ways, including by methods known in the 3-D printing arts and electrospinning. In other embodiment, the mesh is disordered, i.e., is amorphous in form.

Extracorporeal Filtration Apparatus

Another aspect of the invention is extracorporeal filtration apparatuses. The extracorporeal filtration apparatuses allow for the establishment of an extracorporeal circuit for continuously removing a bodily fluid from a subject, sequestering some or all of a particular solute or particle from a volume of the bodily fluid to clear the solute or particle from the fluid, and to return the solute- or particle-cleared fluid to subject. The extracorporeal filtration apparatus may be useful for treating a subject suffering from a disease or a condition, for the prevention of the onset of a disease or a condition or for the prevention of graft injury, graft dysfunction, transplantation-associated inflammation and thrombosis and/or graft rejection.

Extracorporeal filtration apparatuses include a first end of a line configured to interface with a subject configured for the removal of a bodily fluid, a second end of a line configured to interface with the subject configured for the return of a fluid to the subject, a pump positioned along the line between the first end and the second end configured for the extracorporeal circulation of the bodily fluid from the first end to the second and, and a filter positioned along the line between the first end and the second end configured to bind or sequester a solute present in the bodily fluid removed from the subject. The extracorporeal filtration apparatuses may comprise a first end of a blood line configured to interface with a first blood vessel of the subject for the removal of blood from the subject; a second end of the blood line configured to interface with a second blood vessel of the subject for the return of blood to the subject; a blood pump positioned along the blood line between the first end and the second end configured for the extracorporeal circulation of blood from the first end to the second end; and any of the filters described above positioned along the blood line between the first end and the second end configured. The extracorporeal filtration apparatus may further comprise a substitution solution pump for the introduction of a substitution solution to the line; an anticoagulant pump for the introduction of an anticoagulant to the line; a filtration pump for the removal of a filtrate from the line; a pressure monitor; a gas monitor; or any combination thereof.

Extracorporeal membrane oxygenation (ECMO) and hemofilters are often used in critically ill patients who have cardiac and pulmonary dysfunctions and who have a high risk of acute lung and kidney injuries [49]. In a dog model, early treatments with continuous veno-venous hemofiltration (CVVH) significantly decreased mortality and acute lung injury in animals with severe drowning accident [50]. The CVVH reduced the levels of circulating pro-inflammatory cytokines and oxidative stress in these animals. Moreover, blood purification by hemofilters is broadly used to remove circulating pathologic mediators from the patients with critical illness, such as severe sepsis and acute respiratory distress syndrome [51].

Depending on surface modifications, hemofilters can remove specific molecules from patient's blood. Cytokine-absorbing hemofilters decreased circulating pro-inflammatory cytokines, heart rate, blood lactate level, intra-abdominal pressure and mortality rate in patients with severe acute pancreatitis [52]. Fibers coated with endotoxin-binding polymyxin B [53, 54] or opsonin [55, 56] have been shown to remove endotoxin and pathogens from patient's blood and ameliorated sepsis and acute respiratory distress syndrome. However, no such hemofilters have been developed to remove DAMPs from the blood of patients with sterile inflammatory and thrombotic complications.

Polycationic polymer-immobilized microfiber meshes may be used during ECMO, CVVH and continuous renal replacement therapy (CRRT) in intensive care units. Removing pro-inflammatory and pro-coagulative mediators from circulation is an unmet need in the treatment of critically ill patients. Polycationic polymer-immobilized microfiber meshes can be developed as safe and effective anti-inflammatory and anti-thrombotic therapeutics for the treatment of patients with traumatic injuries and the enhancement of grafts of organs derived from patients with traumatic injuries.

DAMPs are potential biomarkers and attractive therapeutic targets for critically ill patients [46]. Cellular disruption by trauma releases DAMPs that are one of the key linkers between tissue damage, inflammation and systemic inflammatory response syndrome (SIRS) [32]. DAMPs influence not only disease progress in primary injured sites but also facilitate dysfunction of other organs and systemic complications [40]. Furthermore, negatively charged DAMPs, including hyaluronic acid, cell-free nucleic acids and heparan sulfate, released after allograft reperfusion induced inflammation and thrombosis, which have a negative impact on transplant outcomes [47] and facilitate pulmonary dysfunction and graft-versus-host disease after allogeneic transplantation [41]. Moreover, elevated circulating DAMPs were shown to correlate with the onset of septic shock and organ failure in patients with sepsis [48].

Certain types of DAMPs, including exDNAs and DNA-binding proteins (e.g., histone and HMGB1), are known to be potent pro-coagulants [57, 58]. Moreover, DAMP-stimulated TLRs on platelets and polymorphonuclear cells indirectly promote thrombosis [59, 60]. Activation of TLR4 on platelets enhanced microvascular thrombosis in endotoxemia and trauma animal models [37, 61]. Patients with severe traumatic brain injury (TBI) have increased risk of disseminated intravascular coagulation [62, 63]. Weber et al. demonstrated that TBI elevated the levels of circulating HMGB1 that caused systemic hypoxia, acute lung injury and pulmonary neutrophilia [40]. Lung transplantation from donor mouse with TBI induced acute pulmonary dysfunction, and treatments with HMGB1 neutralizing antibody ameliorated this pulmonary dysfunction [40]. Interestingly, in this study, a normal donor heart perfused with DAMPs developed acute thrombotic complications after transplantation, and treatment with NABP-immobilized microfiber meshes captured and removed DAMPs and prevented the development of thrombotic complications after transplantation (FIG. 8). Therefore, treatment with NABP-immobilized microfiber meshes can reduce systemic DAMP levels and ameliorate inflammatory and thrombotic complications in trauma and transplantation.

Ex Vivo Perfusion or Filtration Machine

Another aspect of the invention is an ex vivo perfusion and/or filtration machine. The machine may be used to reduce or prevent injury to a tissue, graft, or organ, avoiding dysfunction. This allows the tissue, graft, or organ to be available for transplantation into a subject. The machine may also be able to reduce inflammation, thrombosis, or rejection of a tissue, graft, or organ resulting from transplantation of the tissue, graft, or organ into a subject. In some embodiments, the machine is a hypothermic machine, a normothermic machine, or a subnormothermic machine.

An ex vivo perfusion or filtration machine comprises a housing configured to host the tissue, the graft, or the organ. The tissue, graft, or organ may be any tissue, graft, or organ suitable for perfusion. In some embodiments, the organ hosted by the machine is a liver, kidney, heart, lung, or any other organ suitable for perfusion. In some embodiments, the graft is a vascular composite allograft, including, but not limited to, skin, muscle, bone, face, hand, leg, or any other vascular composite allograft suitable for perfusion. The machine further comprises a first end of a line configured to interface with a tissue, a graft, or a organ and allow for the introduction of a perfusate to the tissue, the graft, or the organ and a second end of the line configured to interface with the tissue, the graft, or the organ and allow for the removal of the perfusate from the tissue, the graft, or the organ. The first end may comprise a first cannula configured to introduce the perfusate to arterial vasculature. The second end may comprise a second cannula configured to remove the perfusate from venous vasculature. The machine further comprises a pump positioned along the line between the first end and the second end configured for the circulation of the perfusate from the second end to the first end. The machine further comprises a filter comprising a polycationic microfiber formed into a porous mesh positioned along the line between the first end and the second end, wherein the polycationic microfiber is configured to bind or sequester a nucleic acid, a protein, a polysaccharide, a glycosaminoglycan, a biomolecular complex, an exosome, or a microparticle in the perfusate. The polycationic microfiber may be any of the polycationic microfibers disclosed herein. The filter may be any of the filters described herein.

The perfusate may be a bodily fluid, preservation solution, or any other fluid suitable for perfusion of tissue, grafts, or organs. The bodily fluid may be blood, lymph, plasma, serum, cerebral spinal fluid, urine or any other bodily fluid. The preservation solution may be any organ preservation solution, including, but not limited to, UW solution, saline, or machine perfusion solution.

The machine may further comprise one or more components. For example, the machine may further comprise a perfusate pump for the introduction of perfusate to the line, an oxygenator to elevate the amount of dissolved oxygen in the perfusate, a filtration pump for the removal of a filtrate from the line, a pressure monitor, a gas monitor, a perfusate reservoir, or any combination of the components.

Methods of Sequestering Molecules, Complexes, and/or Supramolecular Assemblies with Polycationic Microfibers Another aspect of the invention is methods for scavenging solutes from a solution, a biological sample, a preservation solution, or a bodily fluid. The fluids following the sequestration of the solute may be referred to as a solute-cleared fluid. The solute may be any solute of interest capable of being sequestered by a polycationic microfiber. In some embodiments, the solute is a nucleic acid, a protein, a polysaccharide, a glycosaminoglycan, a biomolecular complex, an exosome, or a microparticle.

The method comprises contacting the solution comprising a solute capable of being bound or sequestered by any of the microfibers or filters described above. The solution may be artificially created by human intervention or a biological sample obtained from a subject or a patient. When the solution is a biological sample obtained from a subject or a patient, the solution may be blood, lymph, plasma, serum, cerebral spinal fluid, urine or any other bodily fluid. In certain embodiments, the solution may be organ preservation solution (e.g., UW solution, saline or machine perfusion solution). In certain embodiments, the solution or biological sample comprises cell-free nucleic acids, DAMPs, PAMPs, biomolecular complexes, exosomes, or microparticles.

In an alternative embodiment, the polycationic polymer is deposited into the solution or biological sample and the solution or sample comprising the polycationic polymer is contacted with the polymeric core. By depositing the polycationic polymer into the solution or biological sample, you allow for the formation of adjuncts between the polycationic polymer and solutes present. When the adjuncts are later contacted with the polymeric core, the adjuncts may bind to the polymeric core through either chemisorption or physiosorption. This, in turn, sequesters the solutes.

The solute-cleared fluid may have any amount of the solute of interest cleared from the fluid depending on the method for removing the solute and/or the intended use of the solute-cleared fluid. In some embodiments, more than 1% of the solute of interest is removed from the fluid. In certain embodiments, more than 5%, more than 10%, more than 15%, more than 20%, more than 25%, more than 30%, more than 35%, more than 40%, more than 45%, more than 50%, more than 55%, more than 60%, more than 65%, more than 70%, more than 75%, more than 80%, more than 85%, more than 90%, or more than 95% of the solute of interest is removed from the fluid.

Methods for the Treatment of a Disease or a Condition

Another aspect of the invention includes methods of treating a subject suffering from a disease or a condition. The methods comprise administering a therapeutically effective amount of a solute-cleared fluid to the subject, wherein the solute-cleared fluid is prepared from a bodily fluid. In some embodiments, the solute-cleared fluid is administered continuously. This may be accomplished through the use of an extracorporeal filtration apparatus that removes a small portion of the subject's blood, clears some portion of a solute of interest, and then returns the solute-cleared fluid to the subject. Because the solute-cleared fluid is administered continuously, the amount of solute cleared from the bodily fluid may be small. In other embodiments, the solute-cleared fluid is administered by transfusion. Because transfusion delivers a quantum of solute-cleared fluid to the subject, it may be preferable for the amount of solute cleared from the fluid to be high.

The bodily fluid may be any bodily fluid comprising a solute capable of being sequestered by a polycationic microfiber. In some embodiments, the bodily fluid is blood, lymph, plasma, serum, cerebral spinal fluid, urine or any other bodily fluid. The bodily fluid may be removed from the subject. In other embodiments, the bodily fluid may originate from a donor.

The disease or condition may be any disease or condition that may be effectively treated by the administration of a solute-cleared fluid. In some embodiments, the disease or the condition is selected from the group consisting of an organ transplant donor, an organ transplant recipient, thrombosis, sepsis, inflammatory disease, autoimmune disease, cardiovascular disease, cancer, and patients with infection or trauma.

The solute-cleared fluid may be prepared by any suitable method. In some embodiments, the solute-cleared fluid is prepared by contacting the bodily fluid with a polycationic microfiber as described above. In some embodiments, the solute-cleared fluid is prepared by contacting the bodily fluid with a filter as described above. In some embodiments, the solute-cleared fluid is prepared by contacting the bodily fluid with an extracorporeal filtration apparatus as described above.

Methods for the Prevention of a Disease or a Condition

Another aspect of the invention is methods of prevention of a disease or a condition in a subject. The methods comprise administering a prophylactically effective amount of a solute-cleared fluid to the subject, wherein the solute-cleared fluid is prepared from a bodily fluid. In some embodiments, the solute-cleared fluid is administered continuously. This may be accomplished through the use of a extracorporeal filtration apparatus that removes a small portion of the subjects blood, clears some portion of a solute of interest, and then returns the solute-cleared fluid to the subject. Because the solute-cleared fluid is administered continuously, the amount of solute cleared from the bodily fluid may be small. In other embodiments, the solute-cleared fluid is administered by transfusion. Because transfusion delivers a quantum of solute-cleared fluid to the subject, it may be preferable for the amount of solute cleared fluid to be high.

The bodily fluid may be any bodily fluid comprising a solute capable of being sequestered by a polycationic fiber. In some embodiments, the bodily fluid is blood, lymph, plasma, serum, cerebral spinal fluid, urine or any other bodily fluid. The bodily fluid may be removed from the subject. In other embodiments, the bodily fluid may originate from a donor.

The disease or condition may be any disease or condition that may be effectively treated by the administration of a solute-cleared fluid. In some embodiments, the disease or the condition is selected from the group consisting of an organ transplant donor, an organ transplant recipient, thrombosis, sepsis, inflammatory disease, autoimmune disease, cardiovascular disease, cancer and patients with infection or trauma. In a particular embodiment, the subject is an organ recipient and the disease or the condition is thrombosis.

The solute-cleared fluid may be prepared by any suitable method. In some embodiments, the solute-cleared fluid is prepared by contacting the bodily fluid with a polycationic microfiber as described above. In some embodiments, the solute-cleared fluid is prepared by contacting the bodily fluid with a filter as described above. In some embodiments, the solute-cleared fluid is prepared by contacting the bodily fluid with an extracorporeal filtration apparatus as described above.

Methods of Administering Polycationic Microfibers

The polycationic microfibers described herein may be contacted with cells or tissues directly or indirectly in vivo, in vitro, or ex vivo. Contacting encompasses administration to a cell, tissue, mammal, patient, or human. Further, contacting includes adding the polycationic microfibers to a cell culture to a wound site or site of inflammation or to a solution. Other suitable methods may include introducing or administering the polycationic microfibers to a solution, cell, tissue, mammal, or patient using appropriate procedures and routes of administration as defined below.

In some embodiments the polycationic microfibers are administered to a subject. Administration includes topical, subcutaneous, transcutaneous or any other means of bringing the polycationic microfibers in contact with the subject and the site of inflammation, infection or other site at which anionic compounds need to be adsorbed. The polycationic microfibers described herein may be administered in an amount and way such that the polycationic microfibers are in an effective amount to treat a condition, such as inflammation, infection or reversal of the effects of an anionic compound. An effective amount or a therapeutically effective amount as used herein means the amount of the nanofibers that, when administered to a subject for treating a state, disorder or condition is sufficient to effect a treatment. The therapeutically effective amount will vary depending on the compound, formulation or composition, the disease and its severity and the age, weight, physical condition and responsiveness of the subject to be treated. Treating a subject as used herein refers to any type of treatment that imparts a benefit to a subject afflicted with a disease or a condition or at risk of developing the disease or condition, including improvement in the condition of the subject (e.g., in one or more symptoms), delay in the progression of the disease or condition, delay the onset of symptoms or slow the progression of symptoms, etc.

Discussion

In the Examples that follow, we demonstrate that electrospun microfiber meshes functionalized with polycationic polymers neutralized the ability of nucleic acid as well as non-nucleic acid DAMPs and PAMPs to stimulate TLRs and coagulation pathways. Since polycationic polymers are immobilized on a solid surface, they do not circulate in the blood and enter cells. Therefore, the immobilized configuration of polycationic polymers would be of particular interest to scavenge DAMPs and PAMPs in scenarios of tissue damage and inflammation. Nevertheless, this study also demonstrates that a polycationic polymer-immobilized microfiber mesh is able to remove DAMPs, such as exDNA and HMGB1, from the blood of trauma patients, thereby inhibiting DAMP-stimulated blood coagulation.

Because polycationic polymers are highly positively charged, we initially speculated that all negatively charged DAMPs could be potential targets for the immobilized polycationic polymers. Polycationic polymers immobilized on microfiber meshes inhibited negatively charged polymeric molecules such as DNA, RNA and heparan sulfate [41], but did not inhibit Pam3CSK4, a cationic amphiphilic lipopeptide, and anionic metabolic products (e.g., ATP and uric acid). Furthermore, the polycationic polymer-immobilized microfiber meshes captured and removed circulating HMGB1, a DNA-binding protein composed of two positively charged DNA-binding motifs and a C-terminal acidic tail [42]. This highly negatively charged C-terminal domain likely binds to polycationic polymers. However, the polycationic polymer-immobilized microfiber meshes are unable to inhibit negatively charged LPS. Moreover, treatment with polycationic polymer-immobilized microfiber meshes did not change the growth supporting activity of serum-supplemented culture media. Serum contains a diverse spectrum of anionic proteins (e.g., serum albumin), anionic amino acids (e.g. aspartate and glutamate) and anionic nutrients that are required for survival and growth of cells. These data suggest that polycationic polymer-immobilized microfiber meshes may selectively bind to certain types of anionic DAMPs.

We have previously demonstrated that a prototypic molecular scavenger PAMAM-G3 neutralized the ability of synthetic CpG DNA and polyI:C to stimulate TLRs and induce acute liver damage in mice [16]. However, pharmacokinetics and pharmacodynamics of PAMAM-G3 have not yet been determined. Moreover, many questions of mechanisms of action of PAMAM-G3 remain to be answered, including whether the PAMAM-G3 inhibits DAMPs released from injured cells or tissues, how much negatively charged DAMPs are circulating in the blood of patients with injury, and how much DAMPs are needed to be inhibited by NABPs for the amelioration of inflammatory and thrombotic complications. Surprisingly, PAMAM-G3 marginally neutralized the ability of both DAMPs generated by death-induced cells and trauma patient sera to stimulate TLR9. The in vitro cell growth study suggested that the maximal tolerated dose of PAMAM-G3 was between 20 and 30 µg/ml (FIG. 4D). The levels of exDNAs released from death-induced cells were approximately 17 µg/ml. The levels of exDNAs in the blood of trauma patients were varied between 1 and 16 µg/ml depending on disease severity [43]. Studies show that 200 to 600 ng/ml of HMGB1 is circulating in the blood of patients with traumatic injury [29]. Comparable amounts of exRNAs, other than anionic DAMPs and negatively charged membranous vesicles are simultaneously circulating in the blood of trauma patients [44, 45]. Thus, the maximal tolerated doses of free PAMAM-G3 may be suboptimal and lead to only marginal therapeutic effect. In contrast, either 288 µg/cm$^2$ of PEI or 128 µg/cm$^2$ of PAMAM-G3 can be immobilized onto the PSMA/polystyrene microfiber mesh and the dose of PEI and PAMAM-G3 immobilized onto the microfiber mesh are easily increased. Therefore, immobilized polycationic polymer is a more effective and safer therapeutic agent than free polycationic polymers in this study.

Examples

Generation of Polycationic Polymer-Immobilized Microfiber Meshes

Electrospinning is broadly used to form continuous fibers using a polymer solution with an applied voltage [23, 24]. It has been demonstrated that poly(styrene-alt-maleic anhydride) (PSMA) polymers formed microfibrous meshes by electrospinning [25], and these meshes have been demonstrated to functionally immobilize large molecules, e.g., enzymes, by covalent conjugation [26]. NABPs were immobilized onto the electrospun PSMA microfiber meshes. To increase the durability of microfiber meshes, a blend of PSMA and polystyrene copolymers was used to generate microfibers. PSMA (0.3 g) (Mw 350,000; Sigma Cat #477699) and polystyrene (0.1, 0.2, 0.3 and 0.4 g) (Sigma Cat #441147; Mw 350,000) were dissolved by constant stirring for 24 h at room temperature in a 1:1:1 (v:v:v) mixture of tetrahydrofuran:acetone:dimethylformamide (3 mL) (Sigma). Microfibers were generated by electrospinning 2 mL of copolymer solution using a 2 cc glass syringe (Cadence Science, Staunton, VA) at a dispensing rate of 2 ml/h with an applied voltage of ~17.3 kV, as described previously [25, 27]. To generate microfiber meshes, the microfibers were collected on a grounded cylindrical mandrel (~6.4 cm wide with a ~21.6 cm circumstance) spinning at ~130 RPM at a distance of 17.3 cm away from the tip of the syringe needle.

To generate NABP-immobilized meshes, the PSMA/polystyrene microfiber meshes were incubated with a solution of various NABPs in dH$_2$O, including 1.8 kDa branched polyethylenimine (PEI) (Polysciences, Warrington, PA) (0.005 M) and PAMAM-G3 (0.004 M) (Sigma) for 72 h either at room temperature (PEI) or 4° C. (PAMAM-G3) with constant shaking, washed 6 times for 10 min with dH$_2$O, and sterilized in 70% (v/v) ethanol for 30 min, followed by air drying. The levels of NABPs immobilized onto the PSMA/polystyrene meshes were determined by ninhydrin assay.

Microfiber meshes comprising only PSMA tear easily when exposed to water-based solutions. Adding polystyrene was determined to increase the durability of the microfiber mesh as well as increase its mean cross-sectional diameter. Unless otherwise stated, microfiber meshes described in the following examples are prepared with a 3:4 weight ratio of PSMA to polystyrene.

Polycationic Polymers Immobilized on a Microfiber Mesh Inhibits Nucleic Acid and Non-Nucleic Acid TLR Ligands without Adverse Cytotoxic Effects in Cell Culture.

Figure 4A:
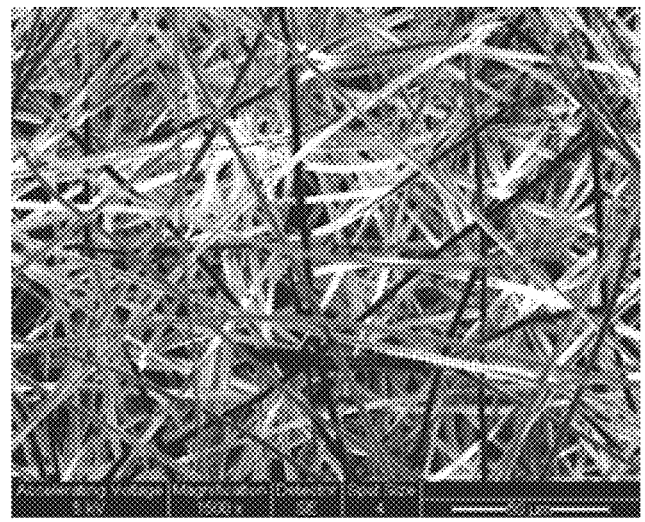
Figure 4B:
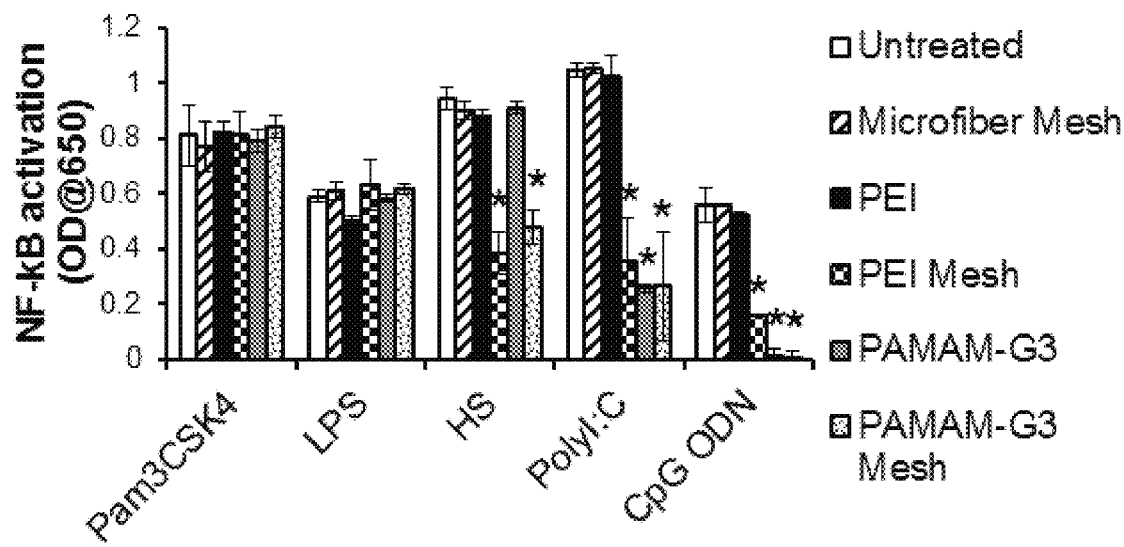
Figure 4C:
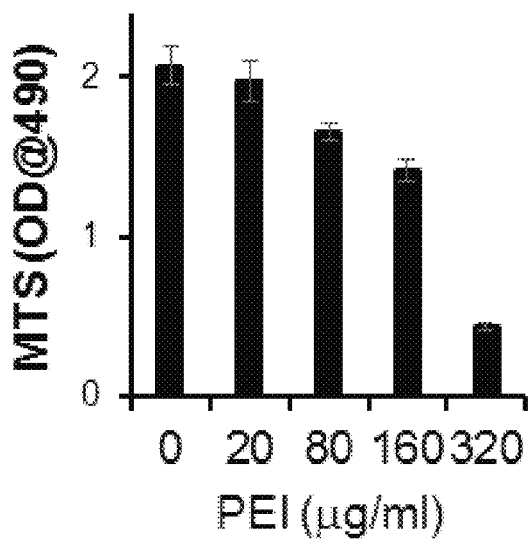
Figure 4D:
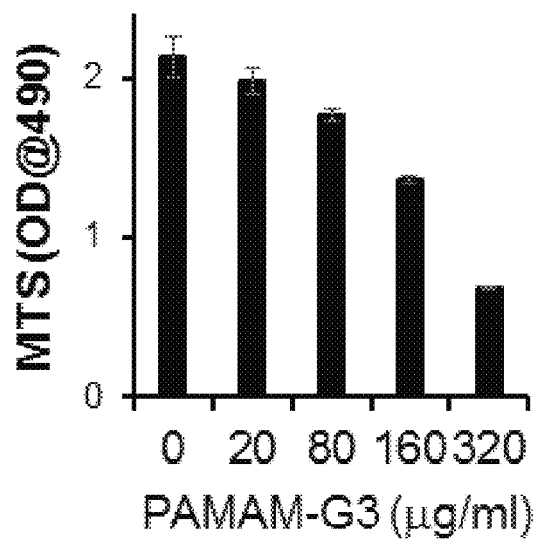
Figure 4D:
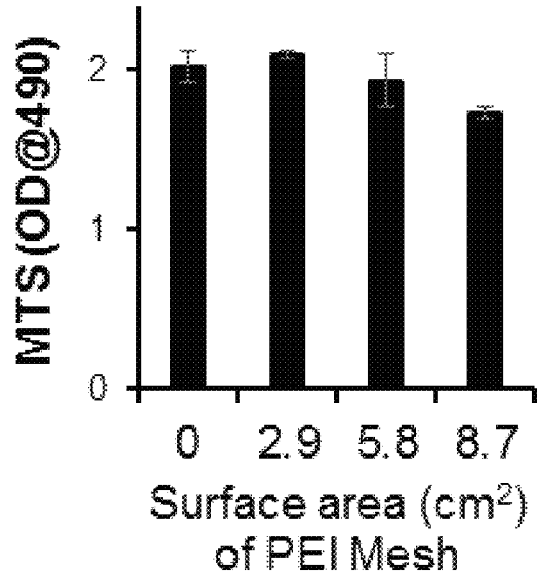
Figure 4F:
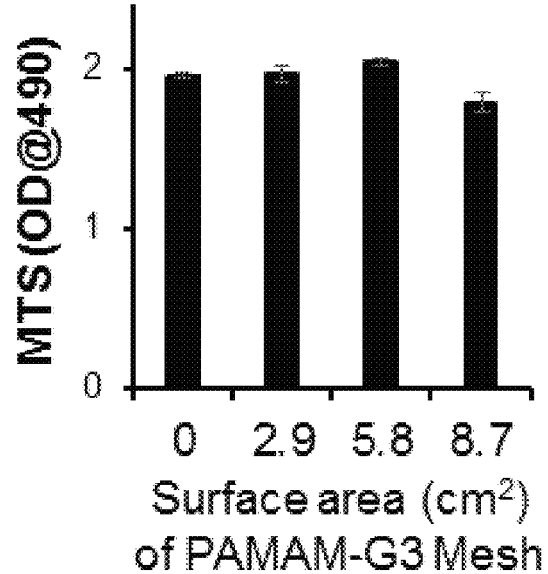
Figure 4G:
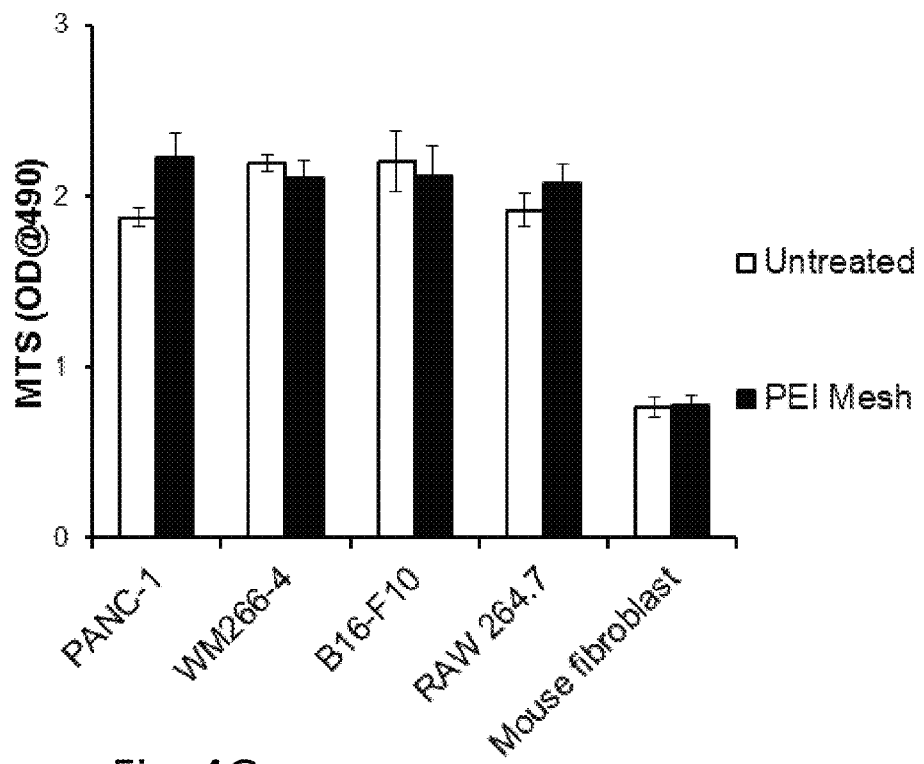
FIG. 4G shows cell proliferation after serum-containing complete culture media was pre-incubated with the indicated cell types for 1 min with PEI-immobilized PSMA/polystyrene microfiber mesh (PEI Mesh). Human pancreatic cancer cell line PANC-1, human melanoma cell line WM266-4, mouse melanoma cell line B16-F10, mouse macrophage cell line RAW264.7 and mouse embryonic fibroblast were cultured for 3 days with either PEI Mesh-treated complete media or untreated complete media. The cell growth was determined using MTS assay.

Non-woven electrospun PSMA/polystyrene microfibers were generated with an average diameter of 2.51±0.06 µm (FIG. 4A). PEI or PAMAM-G3 serving as polycationic polymer was immobilized onto a 6.6×6.6 cm PSMA/polystyrene microfiber mesh. The potential of this polycationic polymer-immobilized PSMA/polystyrene microfiber meshes to inhibit the ability of nucleic acids to stimulate nucleic acid-recognizing TLRs, e.g., TLR3 and TLR9 was compared with unmodified PSMA/polystyrene microfiber mesh of free polycationic polymer in scavenging nucleic acid TLR agonists, such as polyI:C and CpG ODN. Consistent with our previous study [16], free PAMAM-G3 but not free PEI inhibited both polyI:C and CpG ODN to stimulate TLR3 and TLR9, respectively, but they could not inhibit non-nucleic acid TLR agonists, Pam3CSK4, LPS and heparan sulfate (FIG. 4B). PEI- and PAMAM-G3-immobilized meshes also inhibited TLR activation by CpG ODN and polyI:C. Unlike free PAMAM-G3, PEI- and PAMAM-G3-immobilized microfiber meshes inhibit heparan sulfate-mediated activation of TLRs but did not inhibit LPS- and Pam3CSK4-mediated activation of TLRs (FIG. 4B). Furthermore, as expected free PEI and free PAMAM-G3 induced cytotoxicity of human fibroblasts in a dose-dependent manner (FIGS. 4C and 4D). However, treatment with PEI- or PAMAM-G3-immobilized PSMA/polystyrene microfiber meshes did not engender significant cytotoxicity to various human and mouse cell lines and primary cells (FIGS. 4E, 4F, and 4G). These data demonstrate that polycationic polymers immobilized on an electrospun PSMA/polystyrene microfiber mesh is able to inhibit both nucleic acid and certain non-nucleic acid TLR ligands without inducing significant cytotoxicity.

Polycationic Polymer-Immobilized Microfiber Mesh Inhibits DAMP- and PAMP-Mediated Stimulation of TLRs.

Figure 5A:
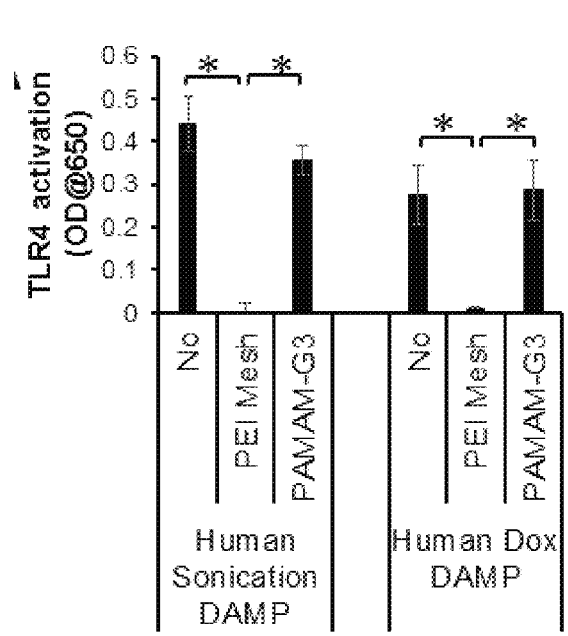
FIGS. 5A-5F show inhibition of DAMP and PAMP-mediated TLR activation by PEI-immobilized PSMA/polystyrene microfiber mesh.
Figure 5B:
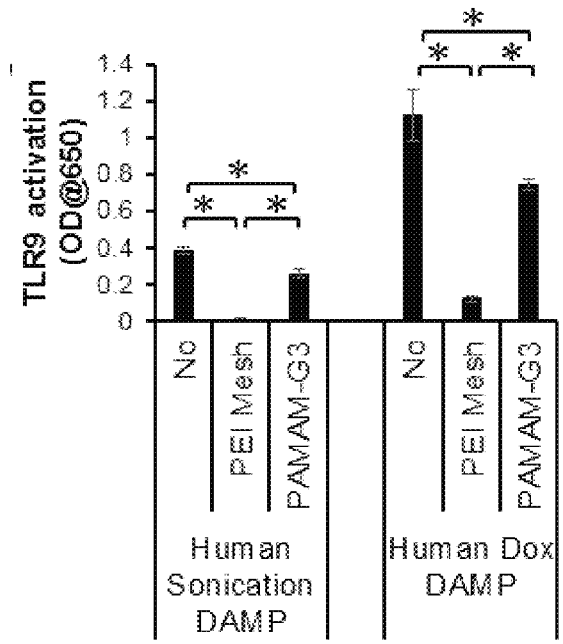
Figure 5C:
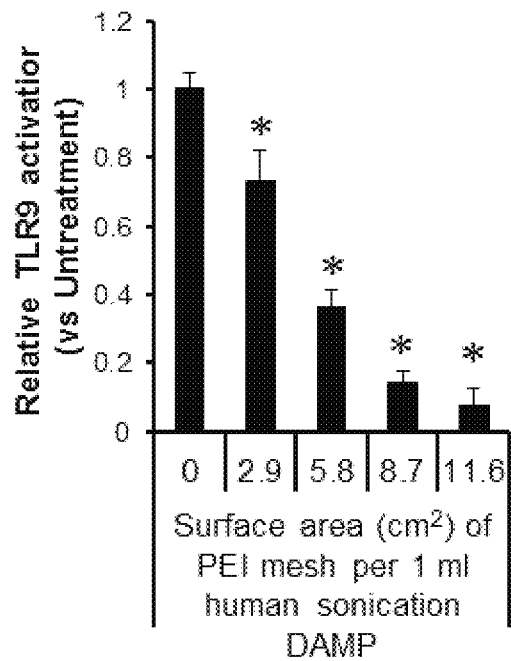
Figure 5D:
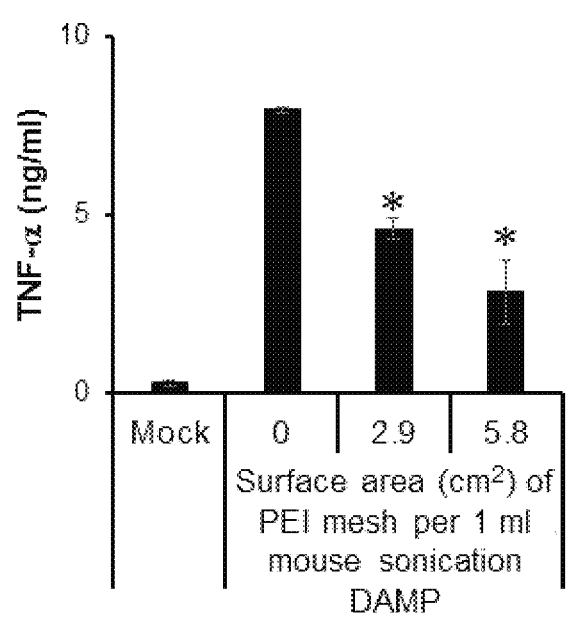
Figure 5E:
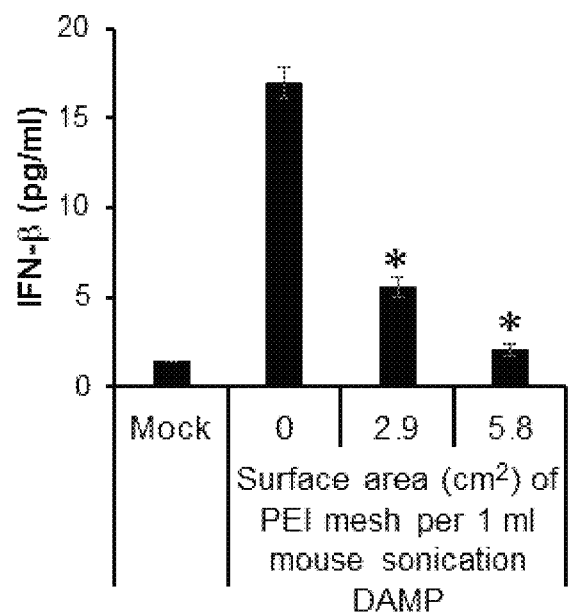
Figure 5F:
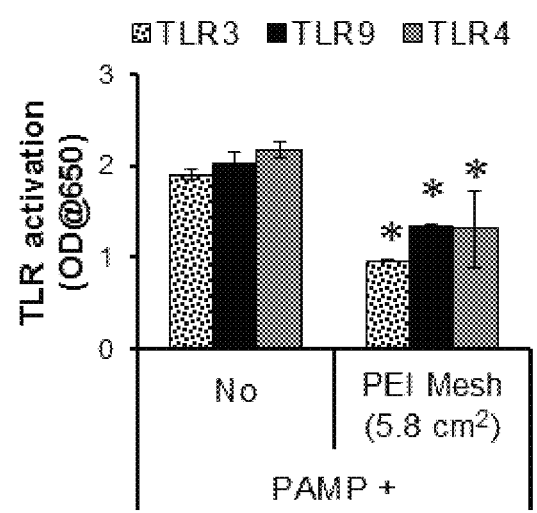

To determine whether polycationic polymer-immobilized PSMA/polystyrene microfiber meshes are able to neutralize the ability of DAMPs to stimulate TLRs, we isolated DAMPs released from dead and dying human and mouse cells. The cells were killed by either sonication- or doxorubicin-induced cell death. DAMPs from either source activated both TLR4 and TLR9. The DAMPs treated with the PEI-immobilized microfiber meshes lost their ability to stimulate the TLR reporter cells in a surface size-dependent manner (FIGS. 5A, 5B, and 5C). Treatments with free PAMAM-G3 significantly, but weakly, inhibited the stimulation of TLR9 reporter cells but did not inhibit the stimulation of TLR4 reporter cells. Moreover, the free PAMAM-G3 was much less potent than the PEI-immobilized microfiber mesh. In addition, the PEI-immobilized microfiber meshes inhibited DAMP activation of mouse macrophages (FIGS. 6D and 6E) and also significantly reduced the ability of bacterial PAMPs to stimulate multiple TLR reporter cells (FIG. 6F).

Polycationic Polymer-Immobilized Microfiber Mesh Removes exDNA and HMGB1 from Extracellular Compartments.

Figure 6A:
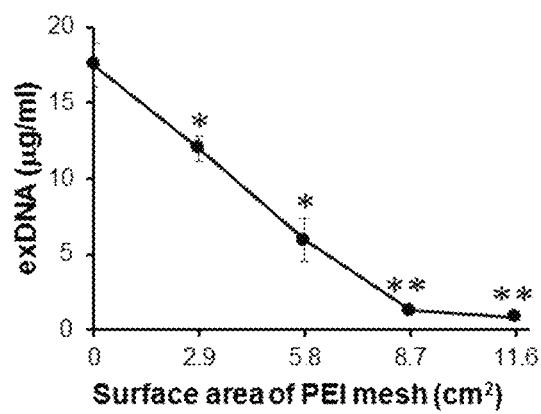
FIGS. 6A-6D shows that PEI-immobilized PSMA/polystyrene microfiber mesh capture and remove exDNA and HMGB1. Human DAMPs generated by sonication-induced cell death were treated with PEI-immobilized PSMA/polystyrene meshes at various surface sizes. The levels of (FIG. 6A) exDNAs, (FIG. 6B) HMGB1, (FIG. 6C) ATP and (FIG. 6D) uric acid in the DAMPs were determined by PicoGreen assay, ELISA, Bioluminescence assay and Fluorometric assay, respectively. Error bars are S.D. *Significant different (P<0.05), vs Untreated. **Significant different (P<0.01), vs Untreated.
Figure 6B:
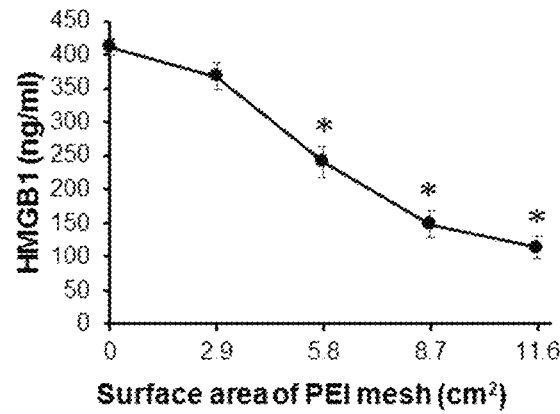
Figure 6C:
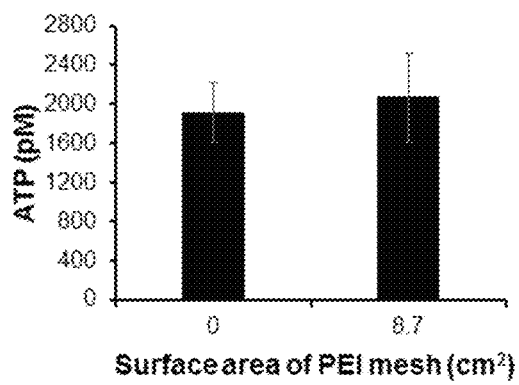
Figure 6D:
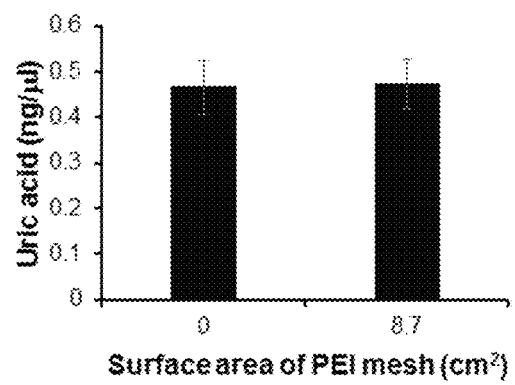

Extracellular DNAs (exDNAs) and HMGB1 released from damaged cells are known as potent inflammatory and thrombotic mediators. The levels of exDNAs and HMGB1 are markedly elevated in the blood of patients with traumatic injuries compared with healthy controls [29, 30]. The exDNA and HMGB1 are endogenous ligands of TLR9 and TLR4, respectively, and they are associated with posttraumatic coagulation abnormalities, activation of complement and severe systemic inflammatory responses [31-33]. To determine whether polycationic polymer-immobilized PSMA/polystyrene microfiber mesh can capture and remove exDNA and HMGB1 from extracellular fluids, the levels of exDNA and HMGB1 released from ex vivo killed human cells were determined before and after treatment with various surface sizes of the PEI-immobilized PSMA/polystyrene microfiber mesh. Both exDNA and HMGB1 was significantly removed from the extracellular milieu by the PEI-immobilized PSMA/polystyrene mesh in a surface size-dependent manner (FIGS. 6A and 6B). Interestingly, PEI-immobilized PSMA/polystyrene mesh did not remove ATP and uric acid, metabolic products released from dead and dying cells [34], from the extracellular fluids (FIGS. 6C and 6D).

Polycationic Polymer-Immobilized Microfiber Mesh Inhibits TLR Stimulation by Trauma Patient DAMPs.

Figure 7A:
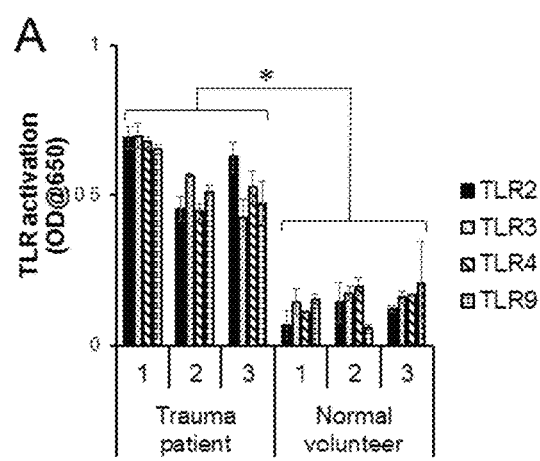
FIGS. 7A-7B show PEI-immobilized microfiber mesh inhibits pro-inflammatory DAMPs from trauma patients.
Figure 7B:
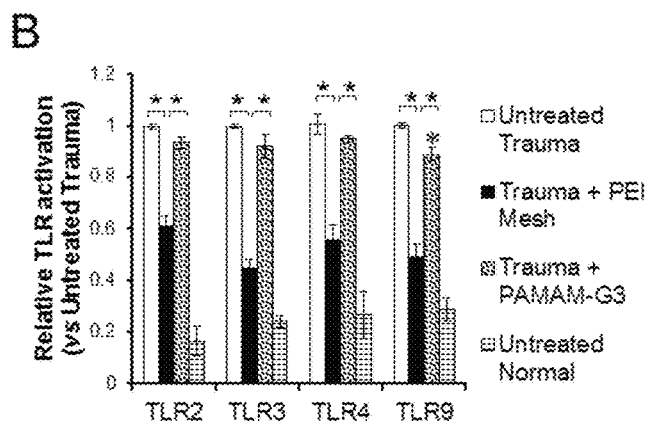

Next, we asked whether the NABP-immobilized meshes can counteract pro-inflammatory DAMPs in the blood of patients with traumatic injuries. DAMPs in sera isolated from the blood of trauma patients significantly increased stimulation of multiple TLR reporter cells, e.g., TLR2, TLR3, TLR4 and TLR9, compared with sera isolated from the blood of normal healthy volunteers (FIG. 7A). The TLR stimulatory activities of trauma patient DAMPs were significantly abrogated by treatment with PEI-immobilized meshes (FIG. 7B). Consistent with DAMPs generated by ex vivo cell death of human and mouse cells, treatment with PAMAM-G3, however, only marginally inhibited patient DAMP-stimulated TLR9 signaling, but did not inhibit patient DAMP-stimulated TLRs 2, 3 and 4 signaling. These data indicate that treatment with NABP-immobilized microfiber meshes can remove multiple immune stimulatory mediators from the blood of patients with traumatic injuries.

Polycationic Polymer-Immobilized Microfiber Mesh Treatment Prevents DAMP-Induced Thrombosis after Heart Transplantation.

Figure 8A:
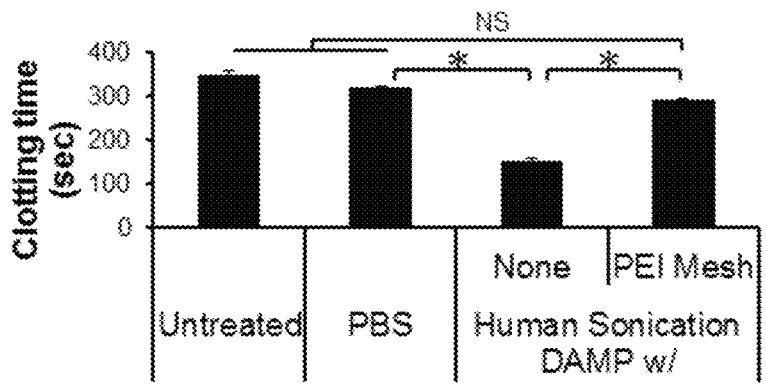
FIGS. 8A-8F shows inhibition of DAMP-induced clotting by PEI-immobilized PSMA/polystyrene microfiber mesh. Human and mouse sonication-induced DAMPs were incubated for 1 min with or without PEI-immobilized PSMA/polystyrene microfiber meshes (2.9 cm$^2$). The treatment was repeated four times.
Figure 8B:
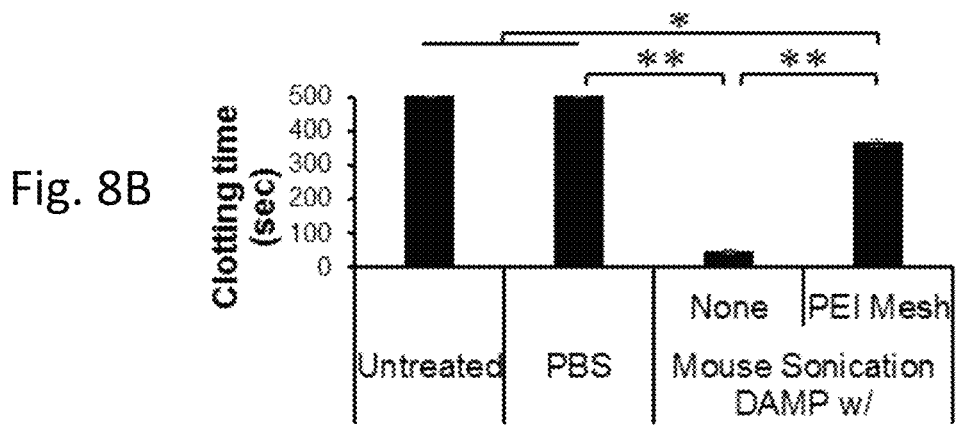
Figure 8C:
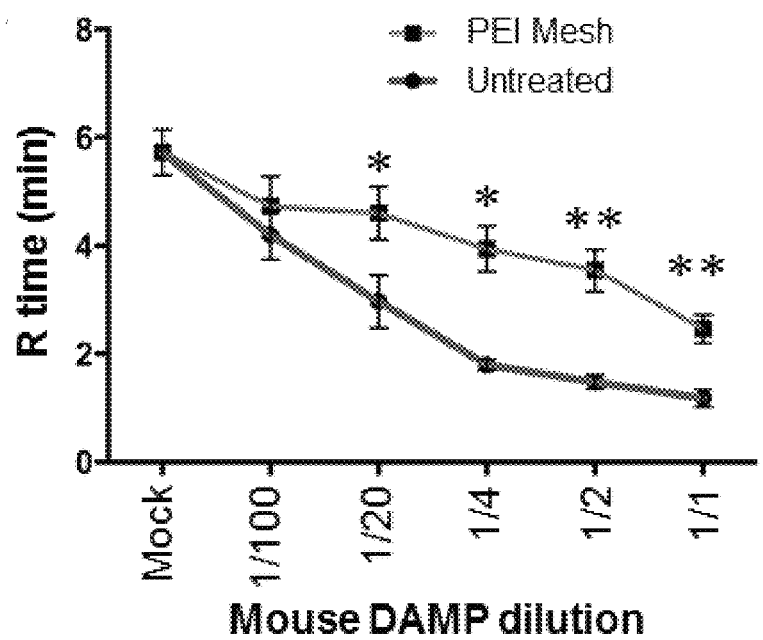
Figure 8D:
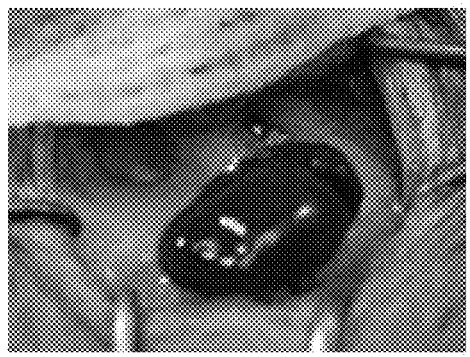
Figure 8E:
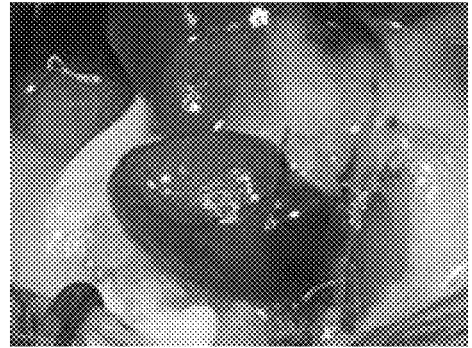
Figure 8F:
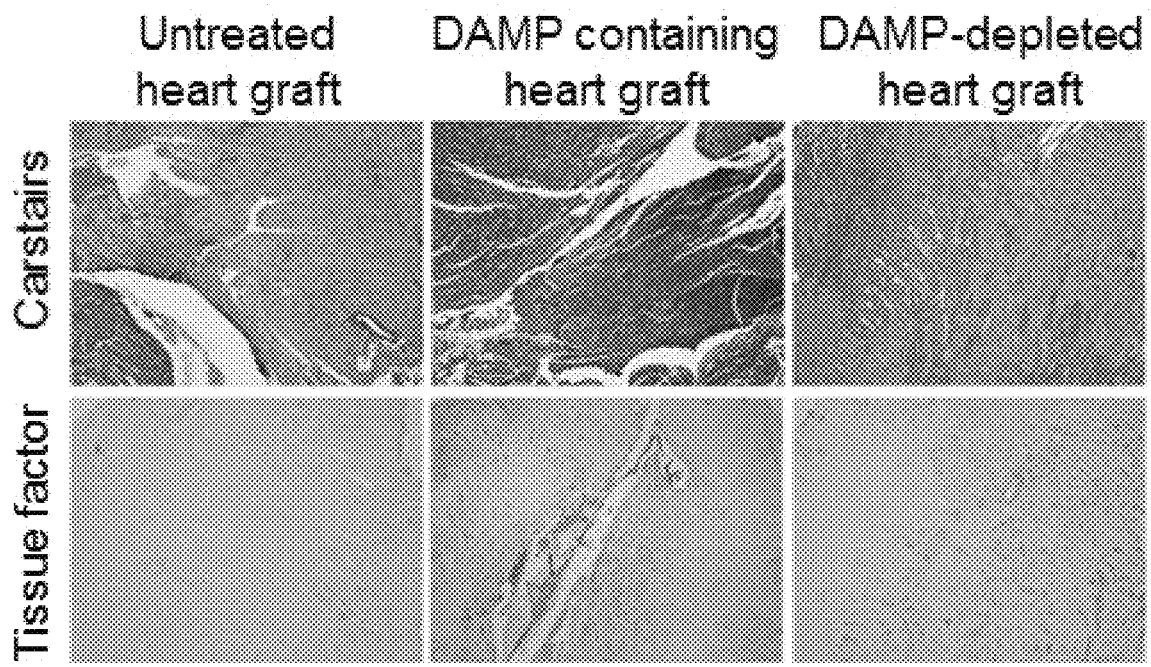

Cell-free DNAs, RNAs and HMGB1 released from injured tissues are known as potent activators of coagulation and platelets [35-37]. Such activation has been associated with thrombotic complications and graft rejection following solid organ transplantation [38, 39]. Moreover, transplantations with lung from traumatic brain injury mice have been shown to develop HMGB1-mediated acute graft rejection [40]. To determine whether polycationic polymer-immobilized microfiber meshes could counteract DAMP-mediated coagulation and graft rejection, we performed in vitro coagulation and heart transplantation studies. DAMPs generated by sonication-induced human and mouse cells accelerated the clotting of human and mouse platelet-depleted plasmas (FIGS. 8A and 8B). Treatments with PEI-immobilized microfiber meshes abrogated the ability of the DAMPs to activate plasma coagulation. Furthermore, the DAMPs dramatically accelerated the clotting of mouse whole blood (FIG. 8C). Consistent with plasma clotting analyses, the pre-treatment with PEI-immobilized microfiber meshes significantly reduced DAMP-induced whole blood coagulation. To access the pro-thrombotic effect of DAMPs in heart transplantation and anti-thrombotic effect of PEI-immobilized microfiber mesh in vivo, we treated donor hearts with DAMPs prior to transplantation. As shown in FIGS. 8D and 8F, donor hearts perfused with DAMPs rapidly developed occlusive thrombosis and stopped beating within 5 min after transplantation. In contrast, no acute thrombosis nor cessation of heart beating was observed in donor hearts from which DAMPs had been captured and removed for 10 minutes (FIGS. 8D and 8F).

Electron Microscopy

Dry PSMA/polystyrene meshes were placed on aluminum foil and mounted on a scanning electron microscope (SEM) stub. The filters were gold sputter-coated for 250 sec using the Denton Vacuum Desk IV sputter unit (Denton Vacuum, Moorestown, NJ) and imaged using a FEI XL30 SEM-FEG (FEI, Hillsboro, OR). Images were analyzed using Scandium (ResAlta Research Technologies, Golden, CO).

Cell Culture

Human normal lung fibroblast (ATCC, Manassas, VA) and human melanoma cell line WM266-4 (ATCC) was maintained in Eagle's Minimum Essential Medium supplemented with 10% FBS, 1× non-essential Amino Acid and 1 mM sodium pyruvate (all from Invitrogen, Carlsbad, CA). Human pancreatic cancer cell line PANC-1 (kindly provided by Dr. Rebekah White, Duke University, Durham, NC), mouse melanoma cell line B16-F10 (ATCC), mouse macrophage cell line RAW264.7 and mouse embryonic fibroblast (ATCC) were maintained in DMEM supplemented with 10% FBS. TLR reporter cell lines, including HEK-hTLR3, HEK-hTLR4 and HEK-hTLR9 cells (InvivoGen, San Diego, CA), stably express an NF-kB/AP-1-inducible secreted embryonic alkaline phosphatase (SEAP) and corresponding TLR, and these reporter cells were maintained by following the manufacturer's instructions. All cells were incubated at 37° C. in a humidified atmosphere with 5% $CO_2$.

Quantification of Cell Growth

Cell growth was quantified at 72 h after treatments using an Celltiter 96® MTS Cell Proliferation Assay Kit (Promega, Madison, WI), according to the manufacturer's instructions.

Preparation of DAMPs

DAMPs were isolated from ex vivo killed cells. To generate doxorubicin-induced cell death, 1×106 cells were incubated for 4 h with doxorubicin (10 µM) (Sigma) followed by washing 5 times with fresh culture media. Cells were incubated for 2 days in 1 ml of culture media. Culture supernatants were collected, centrifuged for 5 min at 1200 RPM and stored at −80° C. until use. To generate sonication-induced cell death, 1×106 cells in 1 ml of Dulbecco's phosphate-buffered saline (DPBS) (Sigma) were sonicated for 1.5 min with Branson Sonifier 250 (Branson Ultrasonics, Danbury, CT). The levels of extracellular DNAs (exDNAs), HMGB1, adenosine triphosphate (ATP) and uric acid in the DAMPs were determined using Quant-iT PicoGreen DNA assay kit (ThermoFisher, Waltham, MA), HMGB1 ELISA kit (Tecan, Morrisville, NC), ATP determination kit (ThermoFisher) and Uric Acid Assay kit (Sigma), respectively, by following the manufacturer's instructions. For circulating DAMPs in human blood, sera from citrated blood samples were collected from 3 patients with polytrauma and 3 normal healthy volunteers. The use of human blood samples was approved by the Institutional Review Board of Duke University Medical Center.

Inhibition of DAMPs Using NABP-Immobilized Meshes

A NABP-immobilized mesh (1.7×1.7 cm; surface area of approximately 2.9 cm2) was inserted into each well of 12-well plate. 1 ml of DAMPs were added into each well containing the NABP-immobilized mesh and incubated for 1 min at room temperature. Unbound DAMPs were harvested and added into a well containing a fresh NABP-immobilized mesh. To increase the dose of NABPs, the surface area of NABP-immobilized mesh was increased by repeated exposure of NABP-immobilized mesh to the DAMPs.

Innate Immune Stimulation by DAMPs

DAMPs with or without pre-treatment with NABP-immobilized meshes were diluted to 25% (v/v) with fresh complete media. TLR reporter cells were incubated with these DAMPs in a 96-well plate. Upon binding to their cognate ligands, TLR signaling activates NF-κB which leads to expression and release SEAP from TLR reporter cells. The level of SEAP release was determined using a colorimetric assay. Briefly, after overnight incubation, 40 µl culture supernatants were harvested and incubated for 3 to 5 h with 180 µQUANTI-Blue™ (InvivoGen) in a flat-bottom 96-well plate. SEAP activity was accessed by reading the optical density (OD) at 650 nm with BioTek Power Wave XS2 ELISA plate reader (BioTek, Winooski, VT). To stimulate mouse macrophage cells, RAW264.7 cells were incubated overnight with the DAMPs. Tumor necrosis factor (TNF)-α and interferon (IFN)-β production by RAW264.7 cells was determined by enzyme-linked immunosorbent assay (ELISA) using BD OptEIA™ TNF-□ ELISA sets (BD Biosciences, Franklin Lakes, NJ) and IFN-β ELISA kit (PBL Biomedical Laboratories, Piscataway, NJ), respectively, by following the manufacturer's instructions. Unmethylated cytosine-phosphodiester-guanine oligodeoxynucleotide (CpG ODN) (5 µM; TLR9 agonist) (InvivoGen), polyI:C (5 µg/ml; TLR3 agonist) (InvivoGen), Pam3CSK4 (100 ng/ml; TLR2 agonist) (InvivoGen), LPS (20 ng/ml; TLR4 agonist) (Sigma) and bovine kidney heparan sulfate (50 µg/ml; TLR4 agonist) (Sigma) were used as TLR stimulator controls. Untreated culture media and DPBS were used as negative controls.

Plasma Coagulation Assay

Human and mouse plasma coagulation assays were performed by described previously with minor modifications [17]. 5 µl DAMPs with or without pre-treatment with NABP-immobilized meshes were added to 50 µl normal pooled human plasma in sodium citrate (George King Bio-Medical Inc., Overland Park, KS) or normal pooled mouse plasma in sodium citrate (C57BL/6) (Biochemed services, Winchester, VA). The reaction was incubated for 3 min at 37° C., followed by the addition of 50 µl $CaCl_2$ (25 mM). Clotting times were recorded using STart® Hemostasis Analyzer (Diagnostica Stago, Parsippany, NJ).

Thromboelastography Assay

To test the efficiency of whole blood coagulation, Thromboelastography (TEG) assay was performed as previously described [17], using citrated whole mouse blood. Untreated mouse DAMPs or PEI mesh-treated mouse DAMPs were added to the citrated mouse blood, together with $CaCl_2$. Time to clot formation (R time, min) was recorded using TEG 500 (Haemoscope Corporation, Niles, IL). Fresh culture media and DPBS were used as negative controls.

Heterotopic Heart Transplantation

CBA (H-2k) mice (Jackson Laboratory, Bar Harbor, ME) were housed in a specific pathogen-free barrier facility and used at 6-12 weeks of age. Heterotopic heart transplantation was performed as previously described [28]. Briefly, the CBA recipient mouse was anesthetized with isoflurane. A segment of descending aorta and vena cava below the renal vessels was dissected. The heart was immediately removed from the CBA donor, flushed with 5 ml of Eurocollins preservation solution and placed in chilled Eurocollins solution on ice. Before transplantation, 2 ml of Eurocollins mixed with either mouse DAMPs or PEI mesh-treated mouse DAMPs was applied to the explanted donor heart via donor aorta and pulmonary artery. The CBA donor heart was then placed in the abdominal cavity of the recipient, and the donor aorta and pulmonary artery were anastomosed in an end-to-side manner to the recipient abdominal aorta and vena cava using 10-0 nylon suture. Acute thrombosis in the transplanted heart was monitored and recorded. The animals were sacrificed at 30 min after unclamping for histological analysis. The explanted grafts were sagittally bisected and fixed in 10% formalin. Paraffin embedded tissue was cut into 5 µm sections and stained with anti-Tissue factor antibody (abcam, ab35807, clone TF9-10H10) and trichrome-based staining (Carstairs) to highlight platelet, fibrin and erythrocytes. All experimental procedures involving the use of mice were performed in accordance with the guidelines and in compliance with the Animal Care and Use Committee of Duke University.

Statistical Analysis

The paired two-tailed Student's t test was applied for determination of statistical significance. A probability of less than 0.05 (P<0.05) was used for statistical significance.

Figure 9A:
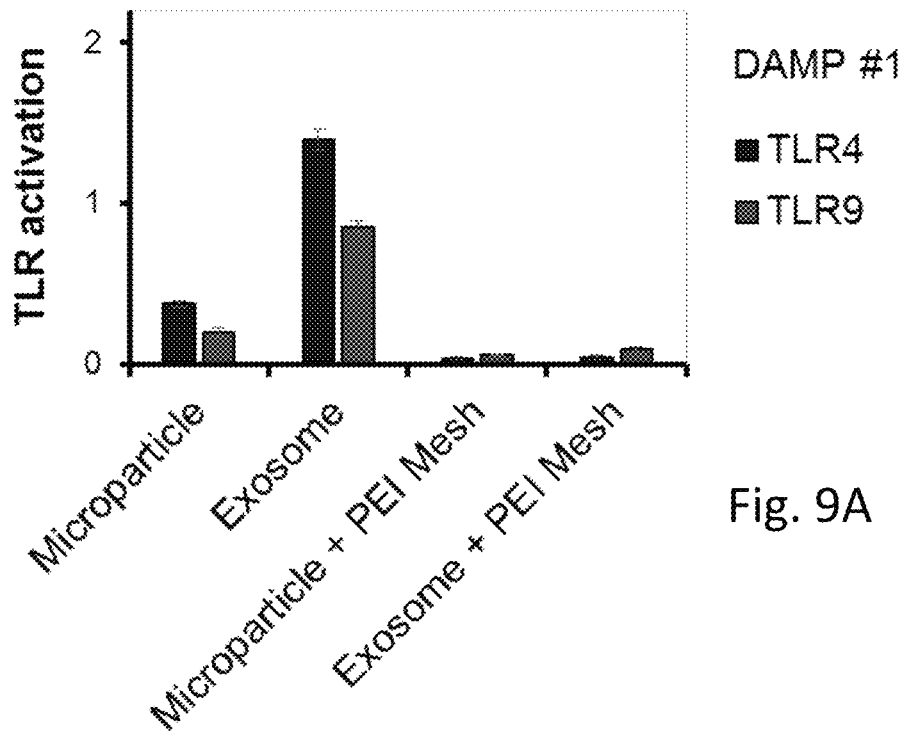
FIGS. 9A-9B shows TLR activation (FIG. 9A) and clotting time (FIG. 9B) for microparticles and exosomes isolated from the culture of doxorubicin-treated human skin cells.
Figure 9B:
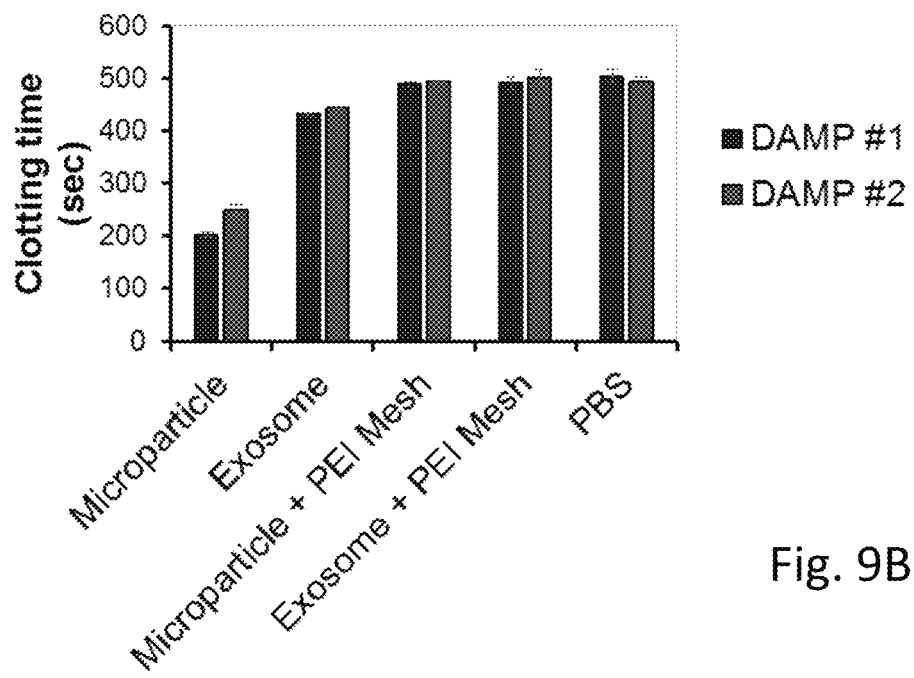

Polycationic Polymer Immobilized Microfiber Meshes Inhibit Cell-Derived Microparticle and Exosome to Activate TLRs and Coagulation DAMPs were isolated from human melanoma cell WM266-4 killed by treatment with either poly I:C transfection (DAMP #1) or doxorubicin (DAMP #2). Microparticles and exosomes were isolated from the DAMP by differential centrifugation. The ability of isolated microparticles and exosomes to activate innate immune receptor TLRs (A) and blood coagulation (B) was determined using TLR reporter assay and modified aPTT assay, respectively. FIGS. 9A and 9B. To inhibit the microparticles and exosomes, microparticles and exosoems were pre-incubated with PEI Mesh Miscellaneous The present disclosure is not limited to the specific details of construction, arrangement of components, or method steps set forth herein. The compositions and methods disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like. All percentages referring to amounts are by weight unless indicated otherwise.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

REFERENCES

[1] Venereau E, Ceriotti C, Bianchi M E. DAMPs from Cell Death to New Life. Front Immunol. 2015; 6:422.
[2] Kawai T, Akira S. TLR signaling. Semin Immunol. 2007; 19:24-32.
[3] Liaw P C, Ito T, Iba T, Thachil J, Zeerleder S. DAMP and DIC: The role of extracellular DNA and DNA-binding proteins in the pathogenesis of DIC. Blood Rev. 2015.
[4] Stoecklein V M, Osuka A, Lederer J A. Trauma equals danger—damage control by the immune system. J Leukoc Biol. 2012; 92:539-51.
[5] Leulier F, Lemaitre B. Toll-like receptors—taking an evolutionary approach. Nat Rev Genet. 2008; 9:165-78.
[6] Feldman N, Rotter-Maskowitz A, Okun E. DAMPs as mediators of sterile inflammation in aging-related pathologies. Ageing Res Rev. 2015; 24:29-39.
[7] Mills K H. TLR-dependent T cell activation in autoimmunity. Nat Rev Immunol. 2011; 11:807-22.
[8] Suurmond J, Diamond B. Autoantibodies in systemic autoimmune diseases: specificity and pathogenicity. J Clin Invest. 2015; 125:2194-202.
[9] Vallejo J G. Role of toll-like receptors in cardiovascular diseases. Clin Sci (Lond). 2011; 121:1-10.
[10] Wiersinga W J. Current insights in sepsis: from pathogenesis to new treatment targets. Curr Opin Crit Care. 2011; 17:480-6.
[11] Okun E, Griffioen K J, Mattson M P. Toll-like receptor signaling in neural plasticity and disease. Trends Neurosci. 2011; 34:269-81.
[12] Pradere J P, Dapito D H, Schwabe R F. The Yin and Yang of Toll-like receptors in cancer. Oncogene. 2014; 33:3485-95.
[13] Barrat F J, Meeker T, Chan J H, Guiducci C, Coffman R L. Treatment of lupus-prone mice with a dual inhibitor of TLR7 and TLR9 leads to reduction of autoantibody production and amelioration of disease symptoms. Eur J Immunol. 2007; 37:3582-6.
[14] Fenhammar J, Rundgren M, Hultenby K, Forestier J, Taavo M, Kenne E, et al. Renal effects of treatment with a TLR4 inhibitor in conscious septic sheep. Crit Care. 2014; 18:488.
[15] Takemura N, Kawasaki T, Kunisawa J, Sato S, Lamichhane A, Kobiyama K, et al. Blockade of TLR3 protects

[16] Lee J, Sohn J W, Zhang Y, Leong K W, Pisetsky D, Sullenger B A. Nucleic acid-binding polymers as anti-inflammatory agents. Proc Natl Acad Sci USA. 2011; 108:14055-60.

[17] Jain S, Pitoc G A, Holl E K, Zhang Y, Borst L, Leong K W, et al. Nucleic acid scavengers inhibit thrombosis without increasing bleeding. Proc Natl Acad Sci USA. 2012; 109:12938-43.

[18] Smith S A, Choi S H, Collins J N, Travers R J, Cooley B C, Morrissey J H. Inhibition of polyphosphate as a novel strategy for preventing thrombosis and inflammation. Blood. 2012; 120:5103-10.

[19] Labieniec-Watala M, Watala C. PAMAM dendrimers: destined for success or doomed to fail? Plain and modified PAMAM dendrimers in the context of biomedical applications. J Pharm Sci. 2015; 104:2-14.

[20] Malik N, Wiwattanapatapee R, Klopsch R, Lorenz K, Frey H, Weener J W, et al. Dendrimers: relationship between structure and biocompatibility in vitro, and preliminary studies on the biodistribution of 125I-labelled polyamidoamine dendrimers in vivo. J Control Release. 2000; 65:133-48.

[21] Mukherjee S P, Lyng F M, Garcia A, Davoren M, Byrne H J. Mechanistic studies of in vitro cytotoxicity of poly (amidoamine) dendrimers in mammalian cells. Toxicol Appl Pharmacol. 2010; 248:259-68.

[22] Mukherjee S P, Byrne H J. Polyamidoamine dendrimer nanoparticle cytotoxicity, oxidative stress, caspase activation and inflammatory response: experimental observation and numerical simulation. Nanomedicine. 2013; 9:202-11.

[23] Dzenis Y. Material science. Spinning continuous fibers for nanotechnology. Science. 2004; 304:1917-9.

[24] Bhardwaj N, Kundu S C. Electrospinning: a fascinating fiber fabrication technique. Biotechnol Adv. 2010; 28:325-47.

[25] Tang C, Ye, S., Liu, H. Electrospinning of poly(styrene-co-maleic anhydride) (SMA) and water-swelling behavior of crosslinked/hydrolyzed SMA hydrogel nanofibers. Polymer. 2007; 48:4482-91.

[26] Stoilova O, Ignatova, M., Manolova, N., Godjevargova, T., Mita, D. G., Rashkov, I. Functionalized electrospun mats from styrene-maleic anhydride copolymers for immobilization of acetylcholinesterase. European Polymer Journal. 2010; 46:1966-74.

[27] Ignatova M, Stoilova O, Manolova N, Markova N, Rashkov I. Electrospun mats from styrene/maleic anhydride copolymers: modification with amines and assessment of antimicrobial activity. Macromol Biosci. 2010; 10:944-54.

[28] Kwun J, Hu H, Schadde E, Roenneburg D, Sullivan K A, DeMartino J, et al. Altered distribution of H60 minor H antigen-specific CD8 T cells and attenuated chronic vasculopathy in minor histocompatibility antigen mismatched heart transplantation in Cxcr3−/− mouse recipients. J Immunol. 2007; 179:8016-25.

[29] Peltz E D, Moore E E, Eckels P C, Damle S S, Tsuruta Y, Johnson J L, et al. HMGB1 is markedly elevated within 6 hours of mechanical trauma in humans. Shock. 2009; 32:17-22.

[30] Simmons J D, Lee Y L, Mulekar S, Kuck J L, Brevard S B, Gonzalez R P, et al. Elevated levels of plasma mitochondrial DNA DAMPs are linked to clinical outcome in severely injured human subjects. Ann Surg. 2013; 258:591-6; discussion 6-8.

[31] Cohen M J, Brohi K, Calfee C S, Rahn P, Chesebro B B, Christiaans S C, et al. Early release of high mobility group box nuclear protein 1 after severe trauma in humans: role of injury severity and tissue hypoperfusion. Crit Care. 2009; 13:R174.

[32] Zhang Q, Raoof M, Chen Y, Sumi Y, Sursal T, Junger W, et al. Circulating mitochondrial DAMPs cause inflammatory responses to injury. Nature. 2010; 464:104-7.

[33] Gando S, Otomo Y. Local hemostasis, immunothrombosis, and systemic disseminated intravascular coagulation in trauma and traumatic shock. Crit Care. 2015; 19:72.

[34] Garg A D, Martin S, Golab J, Agostinis P. Danger signalling during cancer cell death: origins, plasticity and regulation. Cell Death Differ. 2014; 21:26-38.

[35] Kannemeier C, Shibamiya A, Nakazawa F, Trusheim H, Ruppert C, Markart P, et al. Extracellular RNA constitutes a natural procoagulant cofactor in blood coagulation. Proc Natl Acad Sci USA. 2007; 104:6388-93.

[36] Swystun L L, Mukherjee S, Liaw P C. Breast cancer chemotherapy induces the release of cell-free DNA, a novel procoagulant stimulus. J Thromb Haemost. 2011; 9:2313-21.

[37] Vogel S, Bodenstein R, Chen Q, Feil S, Feil R, Rheinlaender J, et al. Platelet-derived HMGB1 is a critical mediator of thrombosis. J Clin Invest. 2015; 125:4638-54.

[38] Slegtenhorst B R, Dor F J, Rodriguez H, Voskuil F J, Tullius S G. Ischemia/reperfusion Injury and its Consequences on Immunity and Inflammation. Curr Transplant Rep. 2014; 1:147-54.

[39] Sayah D M, Mallavia B, Liu F, Ortiz-Munoz G, Caudrillier A, DerHovanessian A, et al. Neutrophil extracellular traps are pathogenic in primary graft dysfunction after lung transplantation. Am J Respir Crit Care Med. 2015; 191:455-63.

[40] Weber D J, Gracon A S, Ripsch M S, Fisher A J, Cheon B M, Pandya P H, et al. The HMGB1-RAGE axis mediates traumatic brain injury-induced pulmonary dysfunction in lung transplantation. Sci Transl Med. 2014; 6:252ra124.

[41] Brennan T V, Lin L, Huang X, Cardona D M, Li Z, Dredge K, et al. Heparan sulfate, an endogenous TLR4 agonist, promotes acute GVHD after allogeneic stem cell transplantation. Blood. 2012; 120:2899-908.

[42] Belgrano F S, de Abreu da Silva I C, Bastos de Oliveira F M, Fantappie M R, Mohana-Borges R. Role of the acidic tail of high mobility group protein B1 (HMGB1) in protein stability and DNA bending. PLoS One. 2013; 8:e79572.

[43] Avriel A, Paryente Wiessman M, Almog Y, Perl Y, Novack V, Galante O, et al. Admission cell free DNA levels predict 28-day mortality in patients with severe sepsis in intensive care. PLoS One. 2014; 9:e100514.

[44] Park M S, Owen B A, Ballinger B A, Sarr M G, Schiller H J, Zietlow S P, et al. Quantification of hypercoagulable state after blunt trauma: microparticle and thrombin generation are increased relative to injury severity, while standard markers are not. Surgery. 2012; 151:831-6.

[45] Fox A, Gal S, Fisher N, Smythe J, Wainscoat J, Tyler M P, et al. Quantification of circulating cell-free plasma DNA and endothelial gene RNA in patients with burns and relation to acute thermal injury. Burns. 2008; 34:809-16.

[46] Timmermans K, Kox M, Scheffer G J, Pickkers P. Danger in the Intensive Care Unit: Damps in Critically Ill Patients. Shock. 2016; 45:108-16.

[47] Braza F, Brouard S, Chadban S, Goldstein DR. Role of TLRs and DAMPs in allograft inflammation and transplant outcomes. Nat Rev Nephrol. 2016; 12:281-90.

[48] Timmermans K, Kox M, Scheffer G J, Pickkers P. Plasma Nuclear and Mitochondrial Dna Levels, and Markers of Inflammation, Shock, and Organ Damage in Patients with Septic Shock. Shock. 2015.

[49] Chen H, Yu R G, Yin N N, Zhou J X. Combination of extracorporeal membrane oxygenation and continuous renal replacement therapy in critically ill patients: a systematic review. Crit Care. 2014; 18:675.

[50] Chen J, Chen G, Xiao D, Peng W, Yu G, Lin Y, et al. Continuous venovenous hemofiltration decreases mortality and ameliorates acute lung injury in canine model of severe salt water drowning. Scand J Trauma Resusc Emerg Med. 2016; 24:40.

[51] Hirasawa H. Indications for blood purification in critical care. Contrib Nephrol. 2010; 166:21-30.

[52] Abe R, Oda S, Shinozaki K, Hirasawa H. Continuous hemodiafiltration using a polymethyl methacrylate membrane hemofilter for severe acute pancreatitis. Contrib Nephrol. 2010; 166:54-63.

[53] Ito M, Kase H, Shimoyama O, Takahashi T. Effects of polymyxin B-immobilized fiber using a rat cecal ligation and perforation model. ASAIO J. 2009; 55:246-50.

[54] Binh N G, Manabe T, Co D X, Tuan N D, Thach P T, Kudo K. Polymyxin-B-immobilized-fiber column hemoperfusion with oseltamivir treatment for ARDS due to influenza H1N1/09. Respirol Case Rep. 2015; 3:57-60.

[55] Kang J H, Super M, Yung C W, Cooper R M, Domansky K, Graveline A R, et al. An extracorporeal blood-cleansing device for sepsis therapy. Nat Med. 2014; 20:1211-6.

[56] Didar T F, Cartwright M J, Rottman M, Graveline A R, Gamini N, Watters A L, et al. Improved treatment of systemic blood infections using antibiotics with extracorporeal opsonin hemoadsorption. Biomaterials. 2015; 67:382-92.

[57] Gould T J, Vu T T, Swystun L L, Dwivedi D J, Mai S H, Weitz J I, et al. Neutrophil extracellular traps promote thrombin generation through platelet-dependent and platelet-independent mechanisms. Arterioscler Thromb Vasc Biol. 2014; 34:1977-84.

[58] Liaw P C, Ito T, Iba T, Thachil J, Zeerleder S. DAMP and DIC: The role of extracellular DNA and DNA-binding proteins in the pathogenesis of DIC. Blood Rev. 2016; 30:257-61.

[59] Fuchs T A, Brill A, Duerschmied D, Schatzberg D, Monestier M, Myers D D, Jr., et al. Extracellular DNA traps promote thrombosis. Proc Natl Acad Sci USA. 2010; 107:15880-5.

[60] Maugeri N, Campana L, Gavina M, Covino C, De Metrio M, Panciroli C, et al. Activated platelets present high mobility group box 1 to neutrophils, inducing autophagy and promoting the extrusion of neutrophil extracellular traps. Journal of thrombosis and haemostasis: JTH. 2014; 12:2074-88.

[61] Stark R J, Aghakasiri N, Rumbaut R E. Platelet-derived Toll-like receptor 4 (Tlr-4) is sufficient to promote microvascular thrombosis in endotoxemia. PLoS One. 2012; 7:e41254.

[62] Sun Y, Wang J, Wu X, Xi C, Gai Y, Liu H, et al. Validating the incidence of coagulopathy and disseminated intravascular coagulation in patients with traumatic brain injury—analysis of 242 cases. Br J Neurosurg. 2011; 25:363-8.

[63] Gando S. Hemostasis and thrombosis in trauma patients. Semin Thromb Hemost. 2015; 41:26-34.

We claim:

1. A polycationic microfiber comprising
a high-aspect-ratio polymeric core, the polymeric core consisting of a blend of a first core polymer and a second core polymer; and
a polycationic polymer immobilized on the surface of the polymeric core;
wherein the weight ratio of the first core polymer to the second core polymer is about 1.5:1 to about 1:1.5; and
wherein the first core polymer consists of poly(styrene-alt-maleic anhydride).

2. The polycationic microfiber of claim 1,
wherein the first core polymer is a copolymer comprising residues of a first monomer and a second monomer;
wherein the second core polymer comprises residues of the first monomer; and
wherein the polycationic polymer is immobilized preferentially to the residues of the second monomer of the first core polymer.

3. The polycationic microfiber of claim 1, wherein the second core polymer comprises polystyrene.

4. The polycationic microfiber of claim 1, wherein the polymeric core has a mean diameter greater than 2 microns.

5. The polycationic microfiber of claim 1, wherein the polymeric core comprises a first binding moiety, the polycationic polymer comprises a second binding moiety, and the first binding moiety and the second binding moiety have an affinity for each other.

6. The polycationic microfiber of claim 5, wherein the first binding moiety or the second binding moiety is biotin, a biotin-binding moiety, avidin, an avidin-binding moiety, an antigen, an antigen-binding moiety, an antibody, or an antibody-binding moiety.

7. The polycationic microfiber of claim 1, wherein the polycationic polymer comprises poly($\beta$ amino ester), disulfide containing poly($\beta$ amido amine) or poly($\beta$ hydroxyl amine).

8. A filter, the filter comprising the polycationic microfiber of claim 1, wherein the polycationic microfiber forms a porous mesh.

9. An extracorporeal filtration apparatus for sequestering a nucleic acid, a protein, a polysaccharide, a glycosaminoglycan, a biomolecular complex, an exosome, or a microparticle from a subject in need of a treatment for a disease or a condition or for the prevention of the onset of a disease or condition, the filtration apparatus comprising:
(a) a first end of a blood line configured to interface with a first blood vessel of the subject for the removal of blood from the subject;
(b) a second end of the blood line configured to interface with a second blood vessel of the subject for the return of blood to the subject;
(c) a blood pump positioned along the blood line between the first end and the second end configured for the extracorporeal circulation of blood from the first end to the second end; and
(d) a filter comprising the polycationic microfiber of claim 1 formed into a porous mesh positioned along the blood line between the first end and the second end, wherein the polycationic microfiber is configured to bind or sequester the nucleic acid, the protein, the polysaccharide, the glycosaminoglycan, the biomolecular complex, the exosome, or the microparticle from the subject.

10. An ex vivo perfusion or filtration machine, the machine comprising:

(a) a housing configured to host a tissue, a graft, or a organ;
(b) a first end of a line configured to interface with the tissue, the graft, or the organ and allow for the introduction of a perfusate to the tissue, the graft, or the organ;
(c) a second end of the line configured to interface with the tissue, the graft, or the organ and allow for the removal of the perfusate from the tissue, the graft, or the organ;
(d) a pump positioned along the line between the first end and the second end configured for the circulation of the perfusate from the second end to the first end; and
(e) a filter comprising the polycationic microfiber of claim 1 formed into a porous mesh positioned along the line between the first end and the second end, wherein the polycationic microfiber is configured to bind or sequester a nucleic acid, a protein, a polysaccharide, a glycosaminoglycan, a biomolecular complex, a exosome, or a microparticle in the perfusate.

11. A method of sequestering a nucleic acid, a protein, a biomolecular complex, an exosome, or a microparticle from a solution or a sample, the method comprising contacting the solution or the sample comprising the nucleic acid, the protein, the biomolecular complex, the exosome, or the microparticle with the polycationic microfiber of claim 1.

12. A method of treating a subject suffering from a disease or condition, the method comprising administering a therapeutically effective amount of a solute-cleared fluid to the subject, wherein the solute-cleared fluid is prepared from a bodily fluid and wherein the solute-cleared fluid is prepared by contacting the bodily fluid with the polycationic microfiber of claim 1.

13. The method of claim 12, wherein the solute-cleared fluid is administered continuously.

14. A method for the prevention of a disease or a condition in a subject, the method comprising administering an effective amount of a solute-cleared fluid to the subject following organ transplantation, wherein the solute-cleared fluid is prepared from a bodily fluid and wherein the solute-cleared fluid is prepared by contacting the bodily fluid with the polycationic microfiber of claim 1.

15. The method of claim 14, wherein the solute-cleared fluid is administered continuously.

16. A method for the prevention of injury to or dysfunction of tissue, a graft, or an organ to be transplanted into a subject, the method comprising administering an effective amount of a solute-cleared fluid to the tissue, the graft, or the organ, wherein the solute-cleared fluid is prepared from a perfusate, wherein the solute-cleared fluid is prepared by contacting the bodily fluid with the polycationic microfiber of claim 1.

17. A method for the reduction of inflammation, thrombosis, or rejection or a tissue, a graft, or an organ after transplantation of the tissue, the graft, or the organ into a subject, the method comprising administering an effective amount of a solute-cleared fluid to the tissue, the graft, or the organ, wherein the solute-cleared fluid is prepared from a perfusate, wherein the solute-cleared fluid is prepared by contacting the bodily fluid with the polycationic microfiber of claim 1.

* * * * *